US006203262B1

(12) United States Patent
Frich et al.

(10) Patent No.: US 6,203,262 B1
(45) Date of Patent: Mar. 20, 2001

(54) CART LOADING SYSTEM AND METHOD FOR LIBRARY-LIKE MATERIALS

(76) Inventors: Mark R. Frich, 12 Ferndale St., Maplewood, MN (US) 55119; Richard H. Jackson, 1835 63rd Street East, Inver Grove Heights, MN (US) 55077

( * ) Notice: Subject to any disclaimer, the term of this patent is extended or adjusted under 35 U.S.C. 154(b) by 0 days.

(21) Appl. No.: 09/547,084

(22) Filed: Apr. 11, 2000

Related U.S. Application Data

(63) Continuation-in-part of application No. 09/309,377, filed on May 10, 1999, now Pat. No. 6,074,156.

(51) Int. Cl.[7] .................................................... B65G 57/00
(52) U.S. Cl. ........................... 414/331.01; 414/331.06; 414/331.08; 414/331.1; 414/331.11; 414/331.15; 414/575; 414/798.9; 414/809
(58) Field of Search ................................ 414/331, 331.06, 414/331.08, 331.09, 331.1, 331.11, 331.15, 331.16, 331.18, 359, 575, 798.01, 809

(56) References Cited

U.S. PATENT DOCUMENTS

| 3,640,407 | | 2/1972 | Anastasio et al. . | |
|---|---|---|---|---|
| 3,776,404 | | 12/1973 | Anastasio et al. . | |
| 4,055,339 | | 10/1977 | Looney . | |
| 4,189,133 | | 2/1980 | Arrasmith et al. . | |
| 4,229,134 | | 10/1980 | Reist . | |
| 4,242,029 | * | 12/1980 | Musgrave | 414/798.9 |
| 4,462,746 | * | 7/1984 | Smets | 414/798.9 |
| 4,610,346 | * | 9/1986 | Phillipson | 414/798.9 |
| 4,634,333 | * | 1/1987 | Butterly, Jr. et al. | 414/809 |
| 5,244,330 | * | 9/1993 | Tonjes | 414/331.08 |
| 5,274,984 | * | 1/1994 | Fukuda | 414/331.01 |
| 5,399,063 | * | 3/1995 | Passero | 414/798.9 |
| 5,690,463 | | 11/1997 | Yoshie . | |
| 5,934,413 | * | 8/1999 | Konig et al. | 414/331.01 |

* cited by examiner

Primary Examiner—Dean J. Kramer
Assistant Examiner—Paul T. Chin
(74) Attorney, Agent, or Firm—Walter K. Roloff; Robert A. Pajak

(57) ABSTRACT

A cart loading system for placing library-like items onto a library cart is provided for a cart having a plurality of shelves between first and second cart end members. The loading system includes a cart tilting mechanism for receiving and tilting the cart so as to raise the second cart end member relative to a ground plane and relative to said first cart end member such that the shelves are at a selected angle relative to the ground plane. The loading system also includes a placer device having a rack member for supporting an individual item and a pusher element for pushing the individual item off of the rack member. The loading system additionally includes a transport device coupled to the rack member for positioning the rack member in proximity to a selected shelf of the plurality of shelves and in proximity to an open space on the selected shelf away from the first cart end member, so that the pusher element is capable of pushing the individual item off of the rack member and onto the open space on the selected shelf. The system further includes compacting mechanism coupled to the rack member for compacting any library-like items on the selected shelf.

27 Claims, 19 Drawing Sheets

CART LOADING SYSTEM AND METHOD FOR LIBRARY-LIKE MATERIALS

This application is a continuation-in-part of application Ser. No. 09/309,377 filed on May 10, 1999, now U.S. Pat. No. 6,074,156.

FIELD OF THE INVENTION

The present invention relates generally to a system and method for automatically placing materials on library carts, and particularly to a system and method for compacting materials placed on library carts.

BACKGROUND OF THE INVENTION

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of librarians in handling these ever increasing volumes are often overwhelming.

Particularly problematic librarian tasks involve receiving, sorting, and ultimately re-shelving material returned from patrons. For example, these tasks, when manually performed by library personnel upon such ever-growing volumes of books and materials, greatly affect time required to repetitively collect and distribute each piece of material, i.e., "turn-around time" is negatively impacted. Manual performance of these tasks is known to lead to repetitive stress-type physical injuries. These injuries result, for example, from sorting and re-shelving tasks associated with repetitive grasping and positioning of each book or piece of material.

In attempts to minimize these problems, procedures have been developed to provide some degree of automation in such receiving, sorting, and re-shelving tasks. For example, librarians commonly employ wheeled carts, commonly known as "library carts," to transport library materials to be re-shelved. Each library cart usually has three shelves for holding materials in an upright manner, as they would appear on a library shelf. Nevertheless, general use of library carts, however, does not adequately address the aforementioned problems. The term cart, as used here-throughout, generally refers to those carts having shelves with open sides used in libraries and the like.

It should be further noted that valuable library staff time is consumed with selectively loading library carts for efficiency in performing re-shelving of the material. That is, typically a specific library cart is dedicated to returning material to a selected library area according to a library cataloging system. Such "dispatching" therefore efficiently directs each cart to only an area of the library selected to be served by the cart. By serving only a selected library area (i.e., library materials having specific cataloging identification) valuable library staff time is conserved by eliminating random travel throughout the library in random re-shelving. Of course, such selective library cart loading requires time investment from library staff in first determining where in the library certain material is to be re-shelved, then determining which cart is dedicated to that area, and then, finally, physically placing the material onto the particular dedicated library cart.

In general, attempts have been made to mechanically automate tasks of handling printed matter, and particularly books, thereby responding to problems associated with repetitive bending, grasping, and lifting and/or moving materials. For example, in automation pertaining to handling printed materials such as photocopies, U.S. Pat. No. 4,055,339 issued to Looney discloses a sorter apparatus to provide sorting or collating of copies. In U.S. Pat. No. 4,189,133 issued to Arrasmith, et al. a device is disclosed for automatically stacking continuous form documents on a table. U.S. Pat. No. 4,229,134 issued to Reist provides an apparatus for ejecting stacks of printed products from a receiver chute of a stacker device.

With regard to handling library materials, and books in particular, U.S. Pat. Nos. 3,640,407 and 3,776,404 issued to Anastasio, et al. disclose an apparatus for handling books that provides progressively formed book stacks to be removed to a delivery conveyor. U.S. Pat. No. 5,690,463 issued to Yoshie discloses an automated storage and retrieval system. Books handled in this system are required to be stored in barcode-addressed specialized multi-book containers. Such containers must be made an integral part of a library within which the system operates. Consequently, implementation of such a specialized system tends to increase library costs.

The aforedescribed patents however do not adequately address, for instance, the final re-shelving or "back-end" library circulation problem of automatically loading and compacting library materials onto commonly used standard library carts, both in terms of physically loading such carts, and in performing the selective cart and shelf loading operation.

An important consideration in the design of a library cart loading system is noise. Therefore there is a need for library cart loading systems with relatively low noise or unwanted audible sounds while in operation.

Thus, there exists a need for a library cart loading system that performs the task of automatically loading and compacting library materials on a library cart. A need exists for these functions to be performed without holding the material in specialized containers, and in a quiet manner.

SUMMARY OF THE INVENTION

An object of the present invention is to provide a library cart loading system and method that automatically performs tasks of receiving and placing on library carts library material returned from patrons.

Another object of the present invention is to provide a library cart loading system and method that does not require use of specialized containers within the library.

A further object of the present invention is to provide a library cart loading system and method that is quiet in operation.

A yet further object of the present invention is to provide a library cart loading system and method that functions with use of common or industry-standard library carts.

In accordance with the present invention, a library cart loading system and method for selectively placing library materials on a library cart includes a library cart tilting means for receiving a library cart. The cart tilting means then acts to tilt, or raise an end of, the library cart such that shelves of the library cart are at a selected angle relative to a ground plane, i.e., the floor. A library material placer means is adapted for receiving a singular library material item, e.g., a book. The library material placer means is positioned relative to the tilting means so as to be controllably operated to successively place singular book-like materials onto a selected one of the shelves of the library cart while the cart shelves are at the selected angle relative to the ground plane. The placer means includes a materials compacting system for compacting and stacking the materials on the cart shelves in an orderly fashion.

BRIEF DESCRIPTION OF THE DRAWINGS

FIG. 2a is a perspective illustration of a caster wheel assembly of FIG. 2.

DETAILED DESCRIPTION OF THE INVENTION

Figure 1:
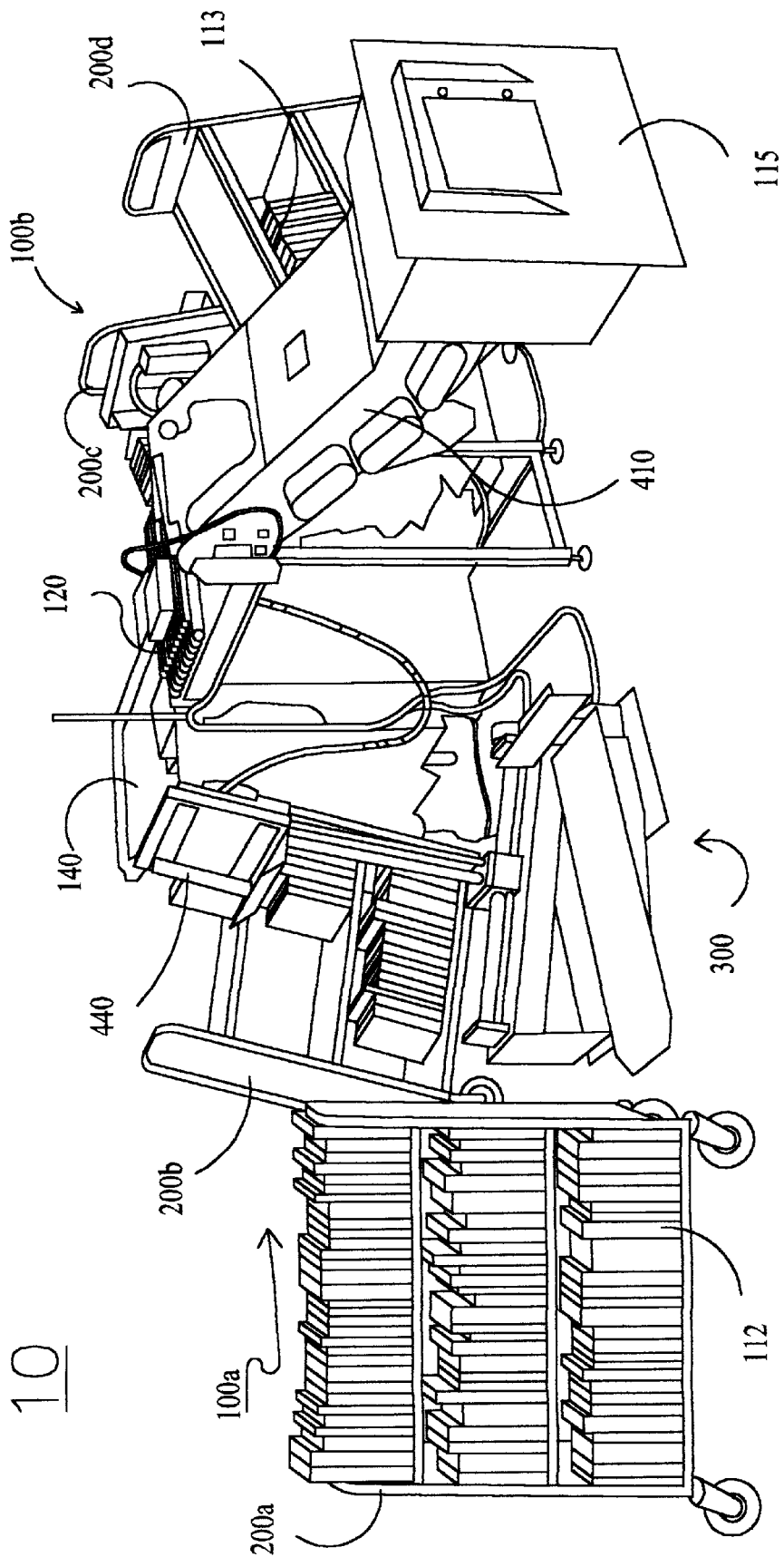
FIG. 1 is a perspective illustration of a library material handling system including the cart loading system of the present invention.
Figure 2:
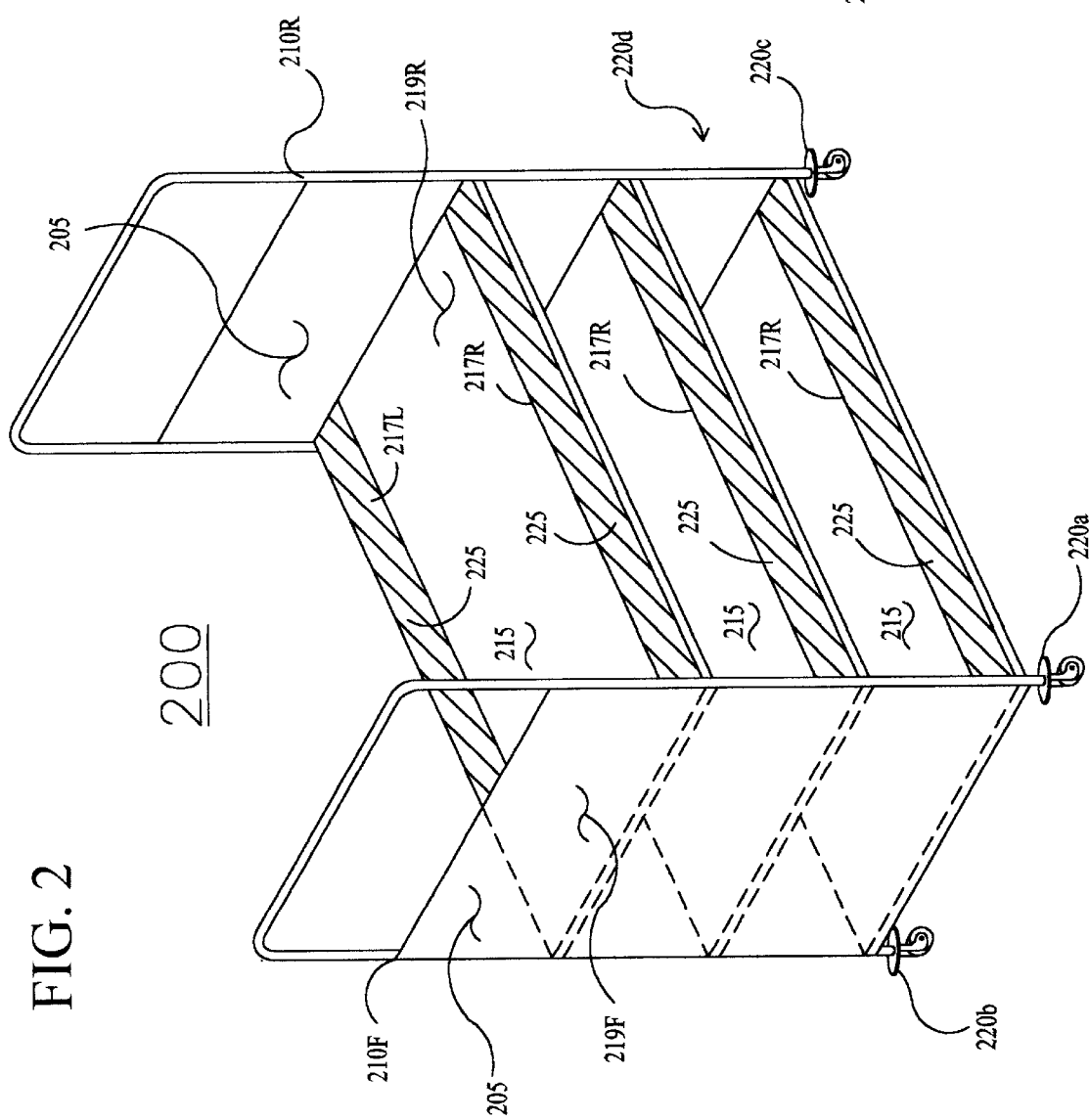
FIG. 2 is a perspective illustration of a library book cart constructed in accordance with the present invention, and depicting an empty or at rest condition.
Figure 3:
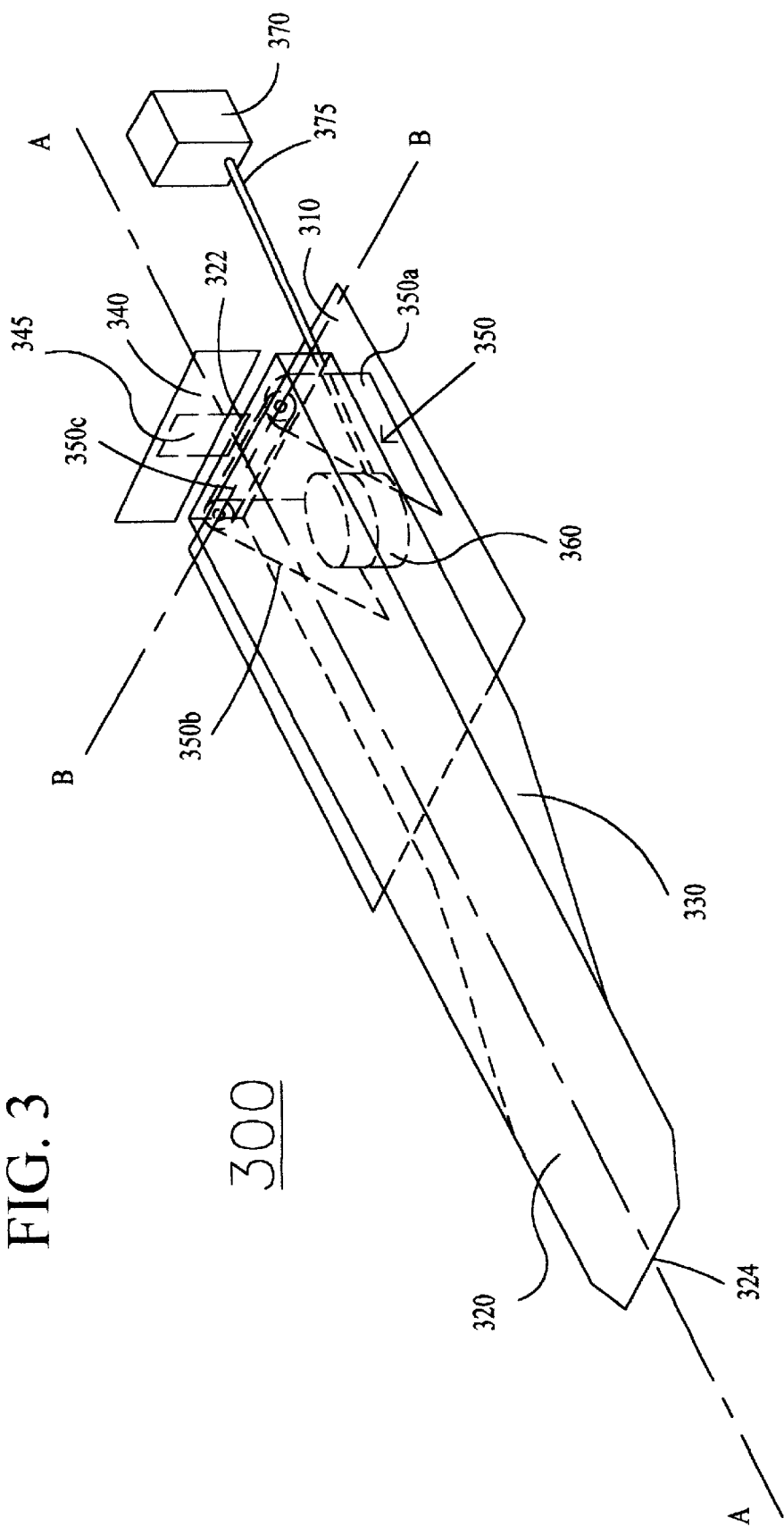
FIG. 3 is a perspective illustration of a library book cart tilting means constructed in accordance with the present invention, and depicting an empty or at rest condition.
Figure 4:
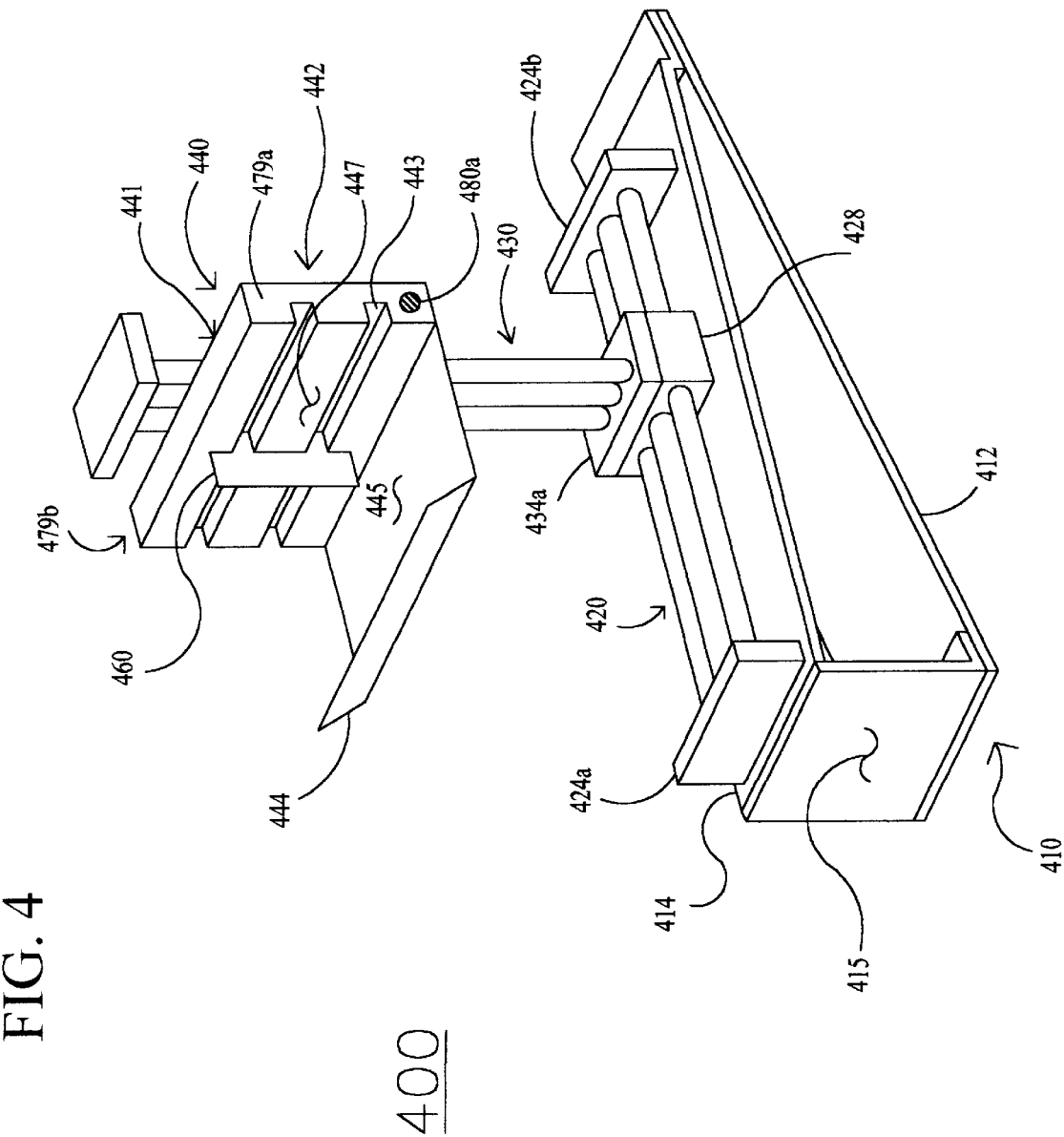
FIG. 4 is a perspective illustration of a library material placer means constructed in accordance with the present invention, and depicting an empty or at rest condition.

Referring to FIGS. 1, 2, 3, and 4, thereshown are perspective illustrations of components of the library cart loading system of the present invention, both in combination as a part of an overall library material handling system (FIG. 1), and as individual components of the system (FIGS. 2–4). In these figures, a library cart loading system includes a plurality of library book carts 200a–d, corresponding library book cart tilting means 300, and library material placer means 400, with each being illustrated in transparent schematic fashion so that inner details may be readily ascertained, as will now be described.

In the following exposition, the words "book" and "material" as used herein are synonymous, and are intended to include any conventional library material such as, but not limited to, a bound book, a "paperback" book, a materials container (such as a magazine series receptacle or holder), a diskette cassette, a video tape, or any other tangible media that may have dimensions or an appearance similar or analogous to a conventional book. Further, it should be noted that books having dimensions in excess of 12" by 15" by 3" are generally considered to be folio, oversize, or jumbo books. Although the library cart loading system and its components may be able to accommodate such oversized library materials, standard library carts are not suited to handle such books. Therefore, specialized carts, if desired, may be employed, or the library handling material system may require special procedures as will be described below.

Illustrated in FIG. 1 is a library material handling system 10 incorporating the library cart loading system of the present invention generally shown as cart loading stations 100a and 100b. Each cart loading station 100a–b includes a tilting means 300 (hereinafter, "tilter 300") and a placer means 400 (hereinafter, "placer 400") including a book rack assembly 440.

FIG. 1 also depicts a plurality of library carts 200a–d, each constructed with three shelves for stacking books 112 cover-end to cover-end, with their spines perpendicular to top surfaces of, and facing outwardly from, the shelves. Books 112 may be stacked on both sides of the shelves as particularly depicted by numeral 113 associated with cart 200d.

An automatic patron-activated library material depository 115 designed for "hands-free" operation receives library materials which are placed on a book transport system (not shown) for successively transporting the materials onto a materials processing station generally identified by numeral 120.

Materials processing station 120 is intended to transport an incoming item of library material onto book rack assembly 440 associated either with one of the cart loading stations 100a–b, or transport the item for deposit into a receiving bin generally identified by numeral 140. More specifically, materials processing station 120 is intended to (i) square the incoming library materials for subsequent reading of a bar code associated with each library material item, or alternatively simply read a radio frequency identification ("RFID") of each item, (ii) selectively orient the material according to the bar code or RFID depending upon cart loading stations 100a or 100b to which the item is intended to be directed and onto which of the carts 200a–d the item is intended to be loaded, and (iii) transport the item to a specific book rack assembly 440 associated with each of the cart loading stations 100a–b.

Although not shown, additional cart loading stations may be provided so that each of the carts may be concurrently loaded from both sides. Further, a control system is intended to be incorporated for reading the bar code, RFID, or other machine readable identifying label or device affixed to the material to direct the material to a selected shelf on a selected cart. Accordingly, each of the carts may be selectively loaded with like-kind materials according to a particular library cataloging system responsive to the bar codes, RFIDs, or other such devices, and each shelf of each cart may likewise be loaded with like-kind materials.

Referring now to FIG. 2, there is illustrated a perspective view of cart 200 constructed in accordance with the present invention. Cart 200 is preferably a commercially available industry-standard three-shelf steel cart such as that available from Highsmith, Inc., of Fort Atkinson, Wis. Briefly, cart 200 generally includes a rectangular box-like frame 205, having vertical side brace members 210 that each include top and bottom ends, horizontal shelves 215, and cart wheel caster assemblies 220.

Each horizontal shelf 215 includes peripheral opposing parallel longitudinal side members 217L and 217R (left and right side, respectively), defined as extending inwardly about 2 inches from an edge of each shelf 215 along the lengths thereof. Further, each of the shelves has opposing parallel widthwise end members 219F and 219R (front and rearward, respectively) attached to vertical side brace members 210F and 210R (front and rearward, respectively). Vertical side brace members 210 and horizontal shelves 215 may be joined or fastened together to achieve the rectangular box-like shape of cart 200, in any suitable manner, such as, for example, welding or riveting. Such joining or fastening results in corner junctions between these members.

Cart 200 further includes single cart wheel caster assemblies located at each bottom corner junction, i.e., the corners of the lowest shelf 215 with bottom ends of vertical side brace members 210. Each of the cart wheel assemblies 220 may generally include a post-like protrusion extending upwardly therefrom for conventional attachment to the aforesaid bottom corner junctions.

FIG. 2a is perspective view of caster wheel assembly 220 of FIG. 2. Further included in each cart wheel assembly 220 is a conventional bearing housing or "caster collar" 221 that provides castering action between a wheel of the wheel assembly and the post-like protrusion attached to the bottom corner junction. These aforedescribed non-illustrated components of wheel assemblies 220 are conventional and known to those skilled in making or using wheeled carts.

Standard library carts have known dimensional spacing relationships of all components thereof. In particular, known spacing relationships exist between the length and width of a cart and its corresponding shelves, as well as between cart wheel assembles 220a–d (220d is not shown in FIG. 2). More particularly, the dimensional relationships of the opposing bottom corner junctions of each vertical side brace member 210F and 210R are known and held to a controlled tolerance. Common or "industry-standard" library carts typically have an inside dimension spacing of about 11.5" between caster collars 221 of wheel assembly 220 pairs, e.g. wheel assemblies 220a and 220b.

Cart 200, in accordance with the present invention, further includes retro-reflective tape 225 bondably affixed to each longitudinal shelf side member 217L and 217R, lengthwise along horizontal shelves 215. Preferably, retro-reflective tape 225 may be a 2" wide 3M reflective tape having part no. 3M-2000X, and marketed as being 3000 times brighter than white. Such retro-reflective tape 225 includes an adhesive backing that enables it to be so affixed to longitudinal shelf side members 217.

Referring now to FIG. 3, there is illustrated a perspective view of tilter 300. Tilter 300 includes a floor mounting base 310, a cart blade or fork member 320, a cart fork support member 330, a vertical backstop 340, a pivot hinge assembly 350, a lifting air spring 360, and an air spring inflation means 370.

In accordance with the present invention, floor mounting base 310 is intended to be securely fastened to a floor surface (not illustrated). Such fastening of floor mounting base 310 to the floor surface may be accomplished by any variety of suitable fastening means (not illustrated) such as, for example, by use of floor anchor bolts that rigidly and planarly join or secure mounting base 310 to the floor surface.

Cart fork member 320 is preferably constructed from a sheet of UHMW plastic, having a thickness of about 0.5". In construction of cart fork member 320, the UHMW plastic sheet is fashioned into a generally rectangular or fork-like member of an average width of 11.5" and a length of about 36". For purposes of further disclosure below, a longitudinal reference axis A—A is identified along a lengthwise centerline of cart fork member 320 that terminates at opposing inboard end member 322 and outboard end member 324, thereof. Outboard end member 324 of cart fork member 320 is further fashioned to a taper or width narrowing symmetrical about longitudinal reference axis A—A, so that a cart 200 may be received or "funneled" thereupon. Specifically, such a symmetrical tapering of outboard end member 324 results in a width narrowing to about 7", from the aforesaid 11.5" average width of cart fork member 320.

The 11.5" average width of cart fork member 320 is specifically selected to accommodate interior spacing between the aforesaid caster collars of cart wheel assemblies 220. That is, the cart fork is intended to achieve a slip fit longitudinally between the known interior spacing between the caster collars of the pair of caster wheels associated with vertical side brace member 210F, and caster collars of the pair of caster wheels associated with vertical side brace member 210R. The selected cart fork member 320 width of 11.5" is intended to provide minimal unwanted transverse movement or "slop" between cart fork member 320 and cart 200 upon loading of cart 200 onto cart fork member 320.

Again referring to FIG. 3, vertical backstop 340 may be fashioned from 0.75" thick UHMW plastic sheet material into a generally rectangular shape, having a vertical rise of 4" and a width of 15". Vertical backstop 340 is rigidly attached to a rearward portion of cart fork support member 330, generally perpendicular to reference axis A—A. Such rigid attachment of vertical backstop 340 to cart fork support member 330 is accomplished by use of an intermediary backstop plate 345 and suitable fasteners (not illustrated). Such fasteners rigidly join vertical backstop 340 to backstop plate 345, and in turn, also join backstop plate 345 to cart fork support member 330. Backstop plate 345 is preferably fabricated from hot-rolled sheet steel having an average thickness of 0.25". In this assembled arrangement of cart fork member 320 with cart fork support member 330 and vertical backstop 340, tilter 300 has a resulting overall L-shaped appearance.

Further illustrated in FIG. 3 is a pivot hinge assembly 350 connectedly incorporated near inboard end member 322 of fork member 320, cart fork support member 330, vertical backstop 340, and mounting base 310. Pivot hinge assembly 350 includes side brace members 350a–b and a hinge 350c having an axis of rotation generally about a reference axis depicted in the drawing as B—B which is in perpendicular alignment relative to axis A—A. Side brace members 350a–b are securely mounted or joined to floor mounting base 310 in a spaced-apart relationship on floor mounting base 310, generally parallel to reference axis A—A of cart fork member 320. Hinge 350c is provided between side brace members 350a–b, generally transversely to reference axis A—A and beneath cart fork member 320.

With pivot hinge assembly 350 thus constructed, cart fork support member 330 and cart fork member 320 are together capable of pivoting about axis B—B relative to floor mounting base 310. Specifically, in this arrangement of pivot hinge assembly 350, outboard end member 324 is capable of being raised relative to inboard end member 322 about reference axis B—B so that fork member 320 is at a selected angle relative to a ground plane upon which tilter 300 rests. In the preferred embodiment of the invention, the intended selected angle is 15 degrees relative to horizontal, as will be further described.

Tilter 300 further includes a lifting air spring 360 for raising outboard end member 324 relative to inboard end member 322, and for rotation about axis B— B. Lifting air spring 360 is preferably a commercially available Firestone air spring (such as that utilized as a heavy vehicle shock absorber) having a 6" diameter and a 1200 lb. capacity. Lifting air spring 360 is preferably positioned under cart fork support member 330 between outboard end member 324 and inboard end member 322, and at the same time in proximity to hinge 350. With this arrangement, lifting air spring 360 is capable of selected inflation or deflation by way of air spring inflation means 370 so as to raise and lower fork member 320 upon command with resultant rotation about axis B—B of hinge 350.

Air spring inflation means 370 provides both inflation and deflation of lifting air spring 360. In providing inflation, air spring inflation means 370 generates and introduces high pressure air into an interior chamber of lifting air spring 360 through air supply line 375. Upon full inflation of lifting air spring 360, air spring inflation means 370 shuts off with the air being contained within the interior chamber. Upon desired deflation of lifting air spring 360, air spring inflation means 370 allows the air to be vented from the interior chamber by way of a reverse air flow through supply line 375.

The operation of tilter 300 will now be described. A library cart 200 is generally positioned so that outboard end member 324 of fork member 320 is initially positioned between a pair of caster wheels 220. Cart 200 is then pushed forward onto fork member 320 until it reaches vertical backstop 340. In turn, inflation means 370 is initiated by a command signal to begin inflating air spring 360. Fork member 320, being acted upon by air spring 360, in turn raises cart 200 until cart shelves 215 are at a selected angle relative to ground. By way of a limit switch (not shown), inflation means 370 stops inflating and cart 200 remains in the raised or elevated position. Upon another command signal to deflate air spring 360, inflation means 370 permits air to be vented from air spring 360 until cart wheel assemblies 220 rest on the floor, permitting cart 200 to be removed from tilter 300.

Figure 5:
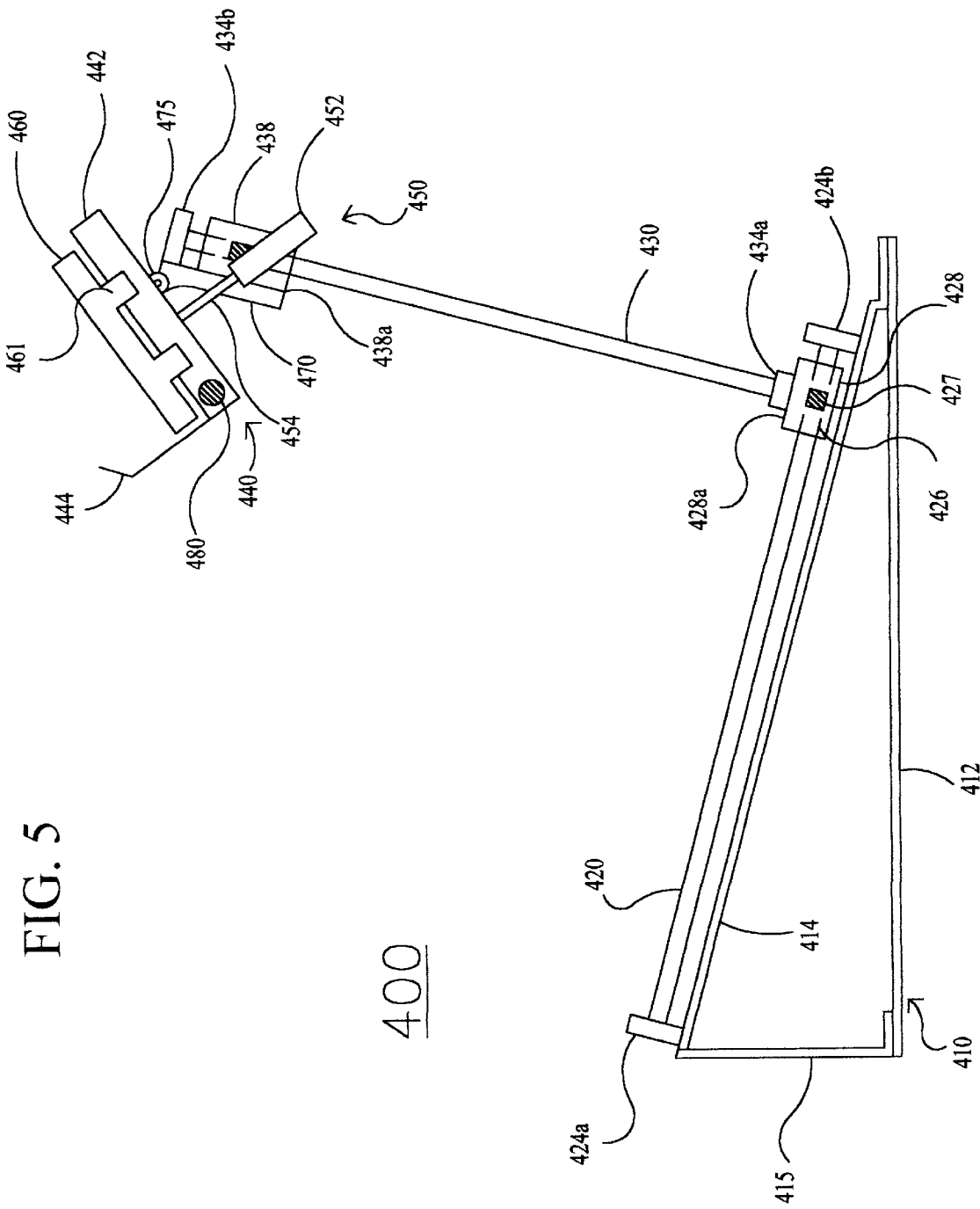
FIG. 5 is a side view illustration of a library material placer means depicted in FIG. 4 and constructed in accordance with the present invention.

Referring now to FIGS. 4 and 5, there is illustrated, respectively, perspective and side views of placer 400. Placer 400 includes a base 410 having a generally right-triangle side view appearance, a forward linear transport slide 420, an upward linear transport slide 430, a book rack assembly 440, a book rack assembly angle adjustment means 450, and a pusher bar 460.

Base 410 is preferably fabricated into the aforesaid right triangle shape from hot-rolled sheet steel having a thickness of 0.5". Base 410 includes a bottom member 412, an upward riser member 415, and an angled top member 414. Bottom member 412 includes floor mounting holes (not shown) to accommodate floor anchoring fasteners (also not shown) to anchor bottom member 412 securely to the aforementioned library floor surface in proximity to the aforedescribed floor mounting base 310 of tilter 300. Top member 414 is illustrated as forming a "hypotenuse" of the triangular arrangement of bottom member 412, top member 414, and riser member 415.

Placer 400 includes a forward linear transport slide 420 coupled to a transverse upward linear transport slide 430. As will subsequently be described, placer 400 is capable of transporting book rack assembly 440 in orthogonal directions, referred herein as forward and upward directions relative to each other.

Figure 6:
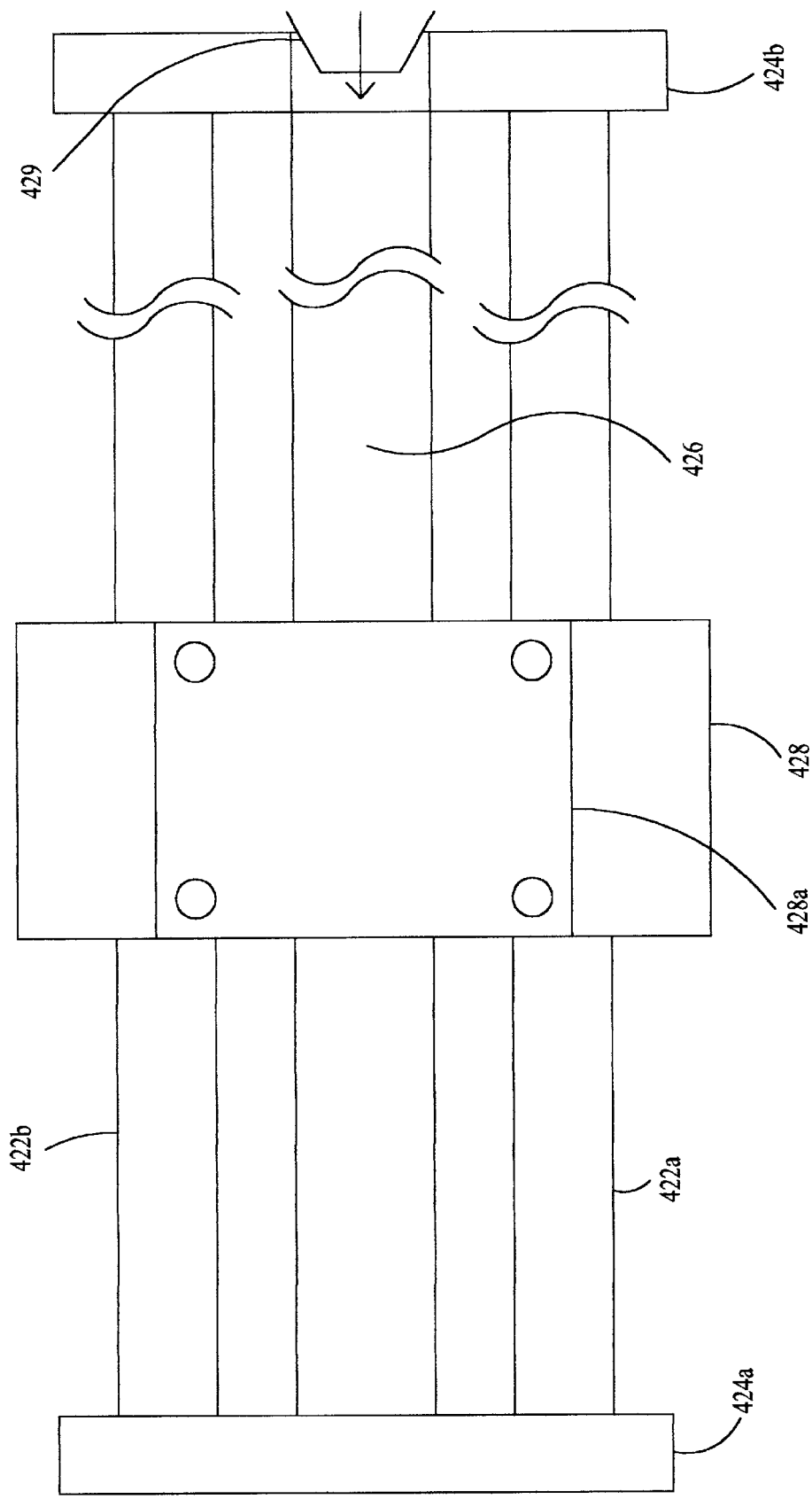
FIG. 6 is a top view illustration of a component of the library material placer means of FIGS. 4 and 5.

Forward linear transport slide 420 is attached to top member 414 of base 410. With particular reference to FIG. 6, forward linear transport slide 420 is shown in detail as preferably a commercially available Bimba "Ultran-Series" rodless air-operated linear slide having a 27" stroke and a 1.5" bore. Such an air-operated forward linear transport slide 420 includes an outside parallel pair of hard chrome plated carbon steel guide rods 422a–b. One end of each of the guide rods 422a–b is secured in place to end block 424a, and the other ends thereof are secured in place to end block 424b. Air-operated forward linear transport slide 420 further includes a center stainless steel piston tube body 426 containing an air-actuated piston 427 therewithin (illustrated in FIG. 5), an end air orifice 429 in communication with an interior of piston tube body 426 (illustrated in FIG. 6), and a carriage 428 having a top mounting surface 428a. Carriage 428 is magnetically coupled to piston 427 within piston tube body 426.

It will be appreciated by those skilled in the art that piston 427 within piston tube body 426, upon receiving sufficient air pressure thereupon introduced through end air orifice 429, will move in response to such air pressure within an interior length of piston tube body 426. Further, such movement of the piston will cause carriage 428, being magnetically coupled thereto, to responsively move longitudinally in parallel with the hypotenuse angled top member 414.

Returning now to FIGS. 4 and 5, upward linear transport slide 430 is preferably a Bimba device that is similar to forward linear transport slide 420 as aforedescribed in detail with reference to FIG. 6. In construction of placer 400, upward linear transport slide 430 is rigidly attached to carriage 428 of base linear slide 420. Specifically as shown in FIG. 5, end block 434a of upward linear transport slide 430 is securely mounted to top mounting surface 428a of carriage 428 of forward linear transport slide 420. As identified in the drawing, upward linear transport slide 430 includes a slidable carriage 438, which like carriage 428 of forward linear transport slide 420, may be slidably positioned along the slide by air pressure.

In FIG. 4, the position of carriage 428 is in a nearly "full back position", and position of carriage 438 is in a nearly "full up position". It should be appreciated that the mounting arrangement of forward linear transport slide 420 and upward linear transport slide 430 is such that upon air actuation of piston 427 within forward linear transport slide 420, carriage 428 is capable of moving linearly along guide rods 422a–b for a full tandem length thereof, and at the same time imparting linear motion to upward liner transport slide 430 and associated carriage 438. Further, upon air actuation of the piston within upward linear transport slide 430, carriage 438 is capable of moving linearly along guide rods 432a–b for a full tandem length thereof. Although not shown, limit switches are preferably incorporated with each slide 420 and 430 to cooperate with electromechanical air controls (not shown) so as to not forcibly cause damage to end blocks 424a–b and 434a–b.

With particular reference to FIG. 5, coupled to carriage 438 of upward linear transport slide 430 is a book rack assembly generally identified by numeral 440. Book rack assembly 440 is pivotally coupled to a mounting bracket 470 by way of hinge 475. Mounting bracket 470 is rigidly attached to a mounting surface 438a of carriage 438.

A book rack assembly angle adjustment means 450 associated with book rack assembly 440 includes an actuation cylinder 452 and an actuator rod 454. Actuation cylinder 452 is pivotally attached to mounting bracket 470, or alternatively to a side of carriage 438. Actuator rod 454 is responsively coupled to actuation cylinder 452 and projects outwardly therefrom, at one end. Actuator rod 454, at its opposite end, is rigidly attached to a rear portion of book rack assembly 440.

Book rack assembly angle adjustment means 450 is intended to be connected to an air supply (not shown) for controlling the action of actuator rod 454 through actuation cylinder 452 so as to either selectively extend or retract actuator rod 454. A resultant rotation of attached book rack assembly 440 is, respectively therefore, clockwise or counter-clockwise about the axis of hinge member 475. Although not shown, the air supply is provided through an air control component known in the art responsive to a control signal (also not shown) so as to achieve the intended action upon command.

Book rack assembly 440 is illustrated in FIGS. 4 and 5 as including a rack member 442 having a slotted planar-like supporting surface 447, and a ledge member 444 having a ledge supporting surface 445. Slidably coupled to book rack assembly 440 is pusher bar 460. Slots 443 of slotted rack member 442 of book rack assembly 440 serve as a key-way so as to accept mating protrusions 461 from pusher bar 460. Pusher bar protrusions 461 and slots 443 assist in preventing thin printed matter such as single sheets of paper from becoming stuck or wedged between pusher bar 460 and the surfaces of rack member 441 and ledge 444 during operation.

Fixed to end 479a of rack member 442 is an optical transmitter/receiver 480a. Another optical transmitter/receiver 480b (not shown) is similarly fixed and arranged on end 479b. Each optical transmitter/receiver 480a and 480b is intended to serve as a sensor for sensing library materials on shelves 215 of carts 200. More specifically, each sensor 480 is intended to (i) direct light toward retro-reflected tape 225 of carts 200, and (ii) detect the presence or absence of reflected light therefrom.

Figure 12:
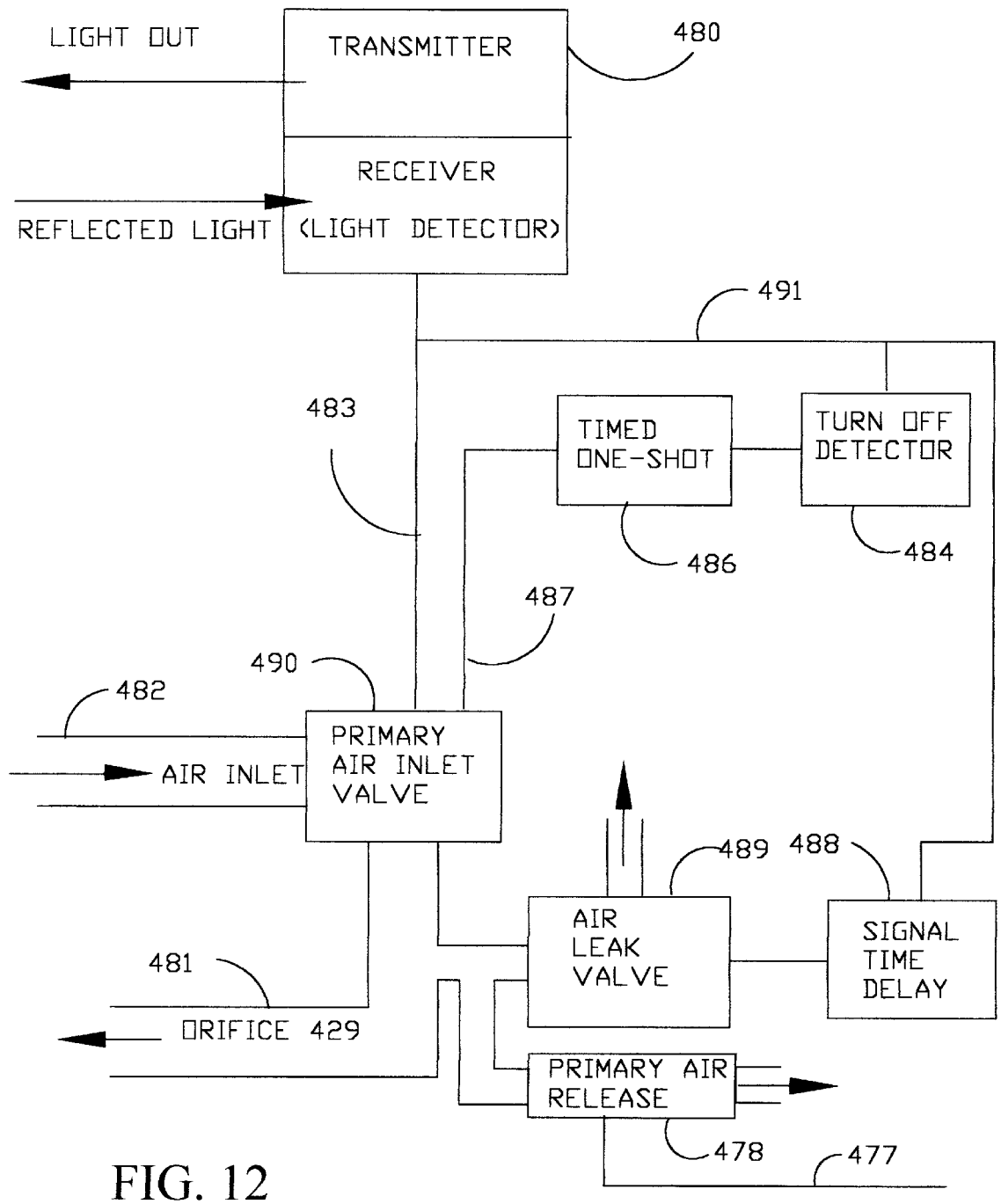
FIG. 12 is a block diagram of an electromechanical control system incorporated for operating the cart loading system of the present invention.

As will be described in FIG. 12, each transmitter/receiver 480 is intended to provide a control signal along signal line 483 to control the operation of an electromechanical primary air inlet valve 490. Upon an absence of detection of any light, valve 490 is open and allows air supplied to orifice 429 to pressurize forward linear transport slide 420 for resultant movement of carriage 428 away from the full back position. This movement is intended to continue until retro-reflected light is detected by the transmitter/receiver 480. Upon detection of light, the valve is closed, and, for the most part, forward motion of carriage 428 ceases.

However, the same control signal along signal line 483 which operates valve 490 also operates an air leak valve 489 through a signal time delay 488 for causing air to be vented from the same inlet side of orifice 429. Air venting, of course, will cause carriage 428 to incrementally return toward the full back position. A turn off detector 484 detects a condition of an instant when receiver 480 detects light and subsequently turns off primary valve 490. This causes a timed-one shot 486 to once again turn on primary valve 490 for a predetermined controlled burst of air to cause a selected incremental forward movement of carriage 428. The latter, as will be subsequently appreciated, permits loading of new materials onto cart 200 without hitting or interfering with those already on the cart. In order to return carriage 428 to the standby or full back position, a primary air release 478 is actuated by a manual or automatic control signal 477.

In the preferred operation of the cart loading system of the present invention, a single placer is intended to be positioned between two tilters. This is particularly illustrated in FIG. 1, where a placer and its associated book rack assembly 440 may load library materials onto carts 200c and 200d. Therefore, each book rack assembly 440 preferably includes two transmitter/receivers 480a and 480b located on opposite sides of assembly 440 for communication with retro-reflected tape 225 on shelves 215 of carts 220 on opposite sides, respectively, of placer 400. Attachment of each transmitter/receiver 480 onto book rack assembly 440 may be accomplished by a wide array of attachment schemes including simply bolting it onto book rack assembly 440.

It should be noted that the position of each transmitter/receiver 480 is critical for proper functioning of an automatic loading operation of a cart 200. In accordance with the present invention, tilter 300 and placer 400 must be properly arranged relative to each other so that (i) forward motion of book rack assembly 440 by way of forward linear transport slide 320, and (ii) the "held" position of carriage 438 of upward linear transport slide 430 relative to a selected shelf 215 for loading thereon, are each such that ledge supporting surface 445 is always sufficiently above the selected shelf 215 top surface so that there exists a line of sight between retro-reflective tape 225 and transmitter/receiver 480. With the arrangement as aforesaid, transmitter/receiver 480 is intended to communicate with retro-reflective tape 225 of cart 200 through (i) emission of infra-red light generated by transmitter/receiver 480 onto tape 225, and (ii) sensing reflection therefrom.

Figure 7:
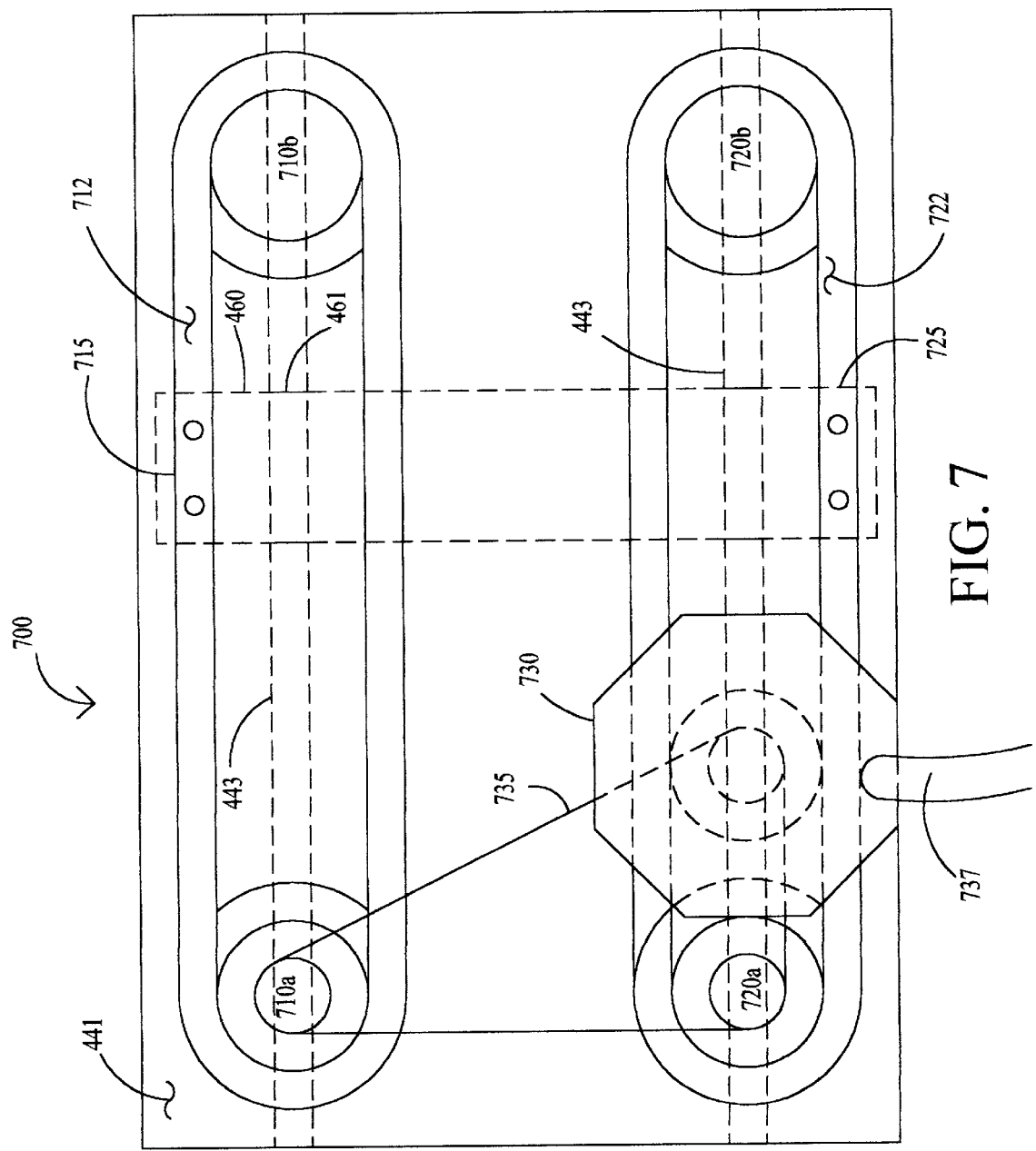
FIG. 7 is a diagrammatic representation of a driver mechanism for a pusher bar of the present invention.

Illustrated in FIG. 7 is a back side 441 of book rack assembly 440 generally illustrating an exemplary drive mechanism 700 for pusher bar 460. There shown are an upper chain and sprocket driver including a pair of sprockets 710a and 710b mounted to back side 441 of rack member 442, a chain drive 712 in drivable engagement with sprockets 710a–b, and an upper end of pusher bar 460 as indicated by numeral 715. A lower chain and sprocket driver includes a pair of sprockets 720a and 720b mounted to back side 441 of rack member 442, a chain drive 722 in drivable engagement with sprockets 720a–b, and a lower end of pusher bar 460 as indicated by numeral 725. A motor 730 is shown mounted to the backside of rack member 442, and is drivably engaged with both sprockets 710a and 720a by way of continuous chain 735. Motor control wiring is generally indicated by numeral 737.

Drive mechanism 700 is intended to move pusher bar 460 laterally across book rack support surface 447 (as shown in FIG. 4) so as to be capable of pushing library materials off of rack member 442 in either direction and onto an awaiting cart shelf 215 in alignment therewith. As should be understood by those skilled in the art, drive mechanism 700 may be implemented by a wide array of techniques including bands instead of chain, as well as electromechanical air valve components and circuit components, or even a linear slide scheme as aforedescribed, in order to achieve the intended function.

It should be noted, however, that when placer 400 is arranged between two carts 200c and 200d, similar to that illustrated in the FIG. 1, placer 400 needs to have advanced notice as to which cart 200c or 200d a subsequently received item or book is intended to be loaded upon. This is so that pusher bar 460 may be positioned at one of opposing ends 479a or 479b of rack member 442 and appropriately move pusher bar 460 to cause an item to be pushed off rack member 442 to the left or to the right per the illustration.

Drive motor 730 is preferably a DC motor. Before receiving an item for loading, a control signal is applied to drive motor 730 to cause pusher bar 460 to be positioned to the right or to the left. Upon receiving an item for cart loading, and subsequent placement of the book rack assembly 440 relative to a selected shelf of a selected cart, drive motor 730 is operated to cause pusher bar 460 to sweep across surface 447 of rack member 442 to push the item off of rack member 442 and onto a selected shelf 215 of a cart 200.

Figure 8:
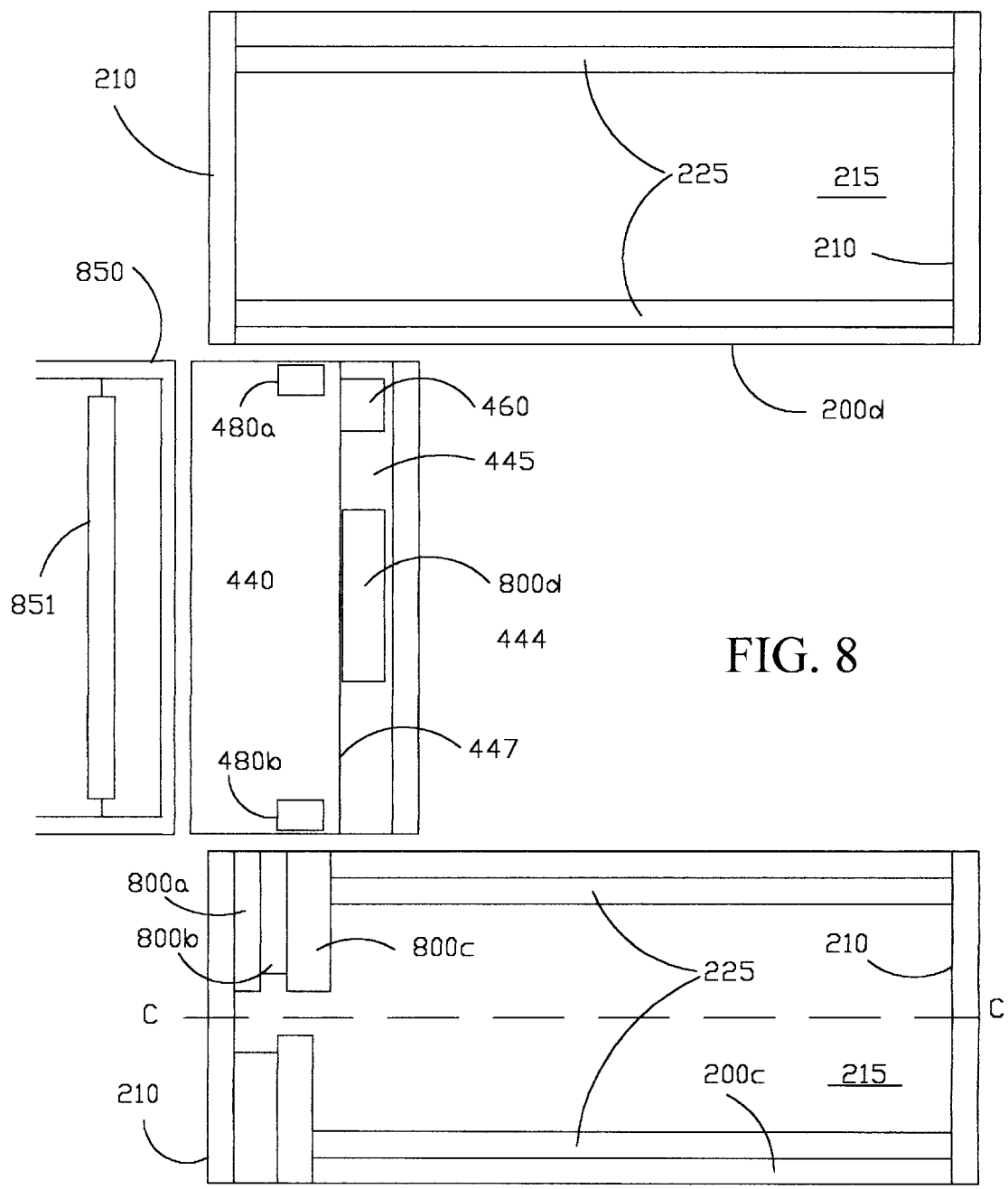
FIG. 8 is a partial top view illustrating the relationship of a placer book rack assembly and a cart.
Figure 9:
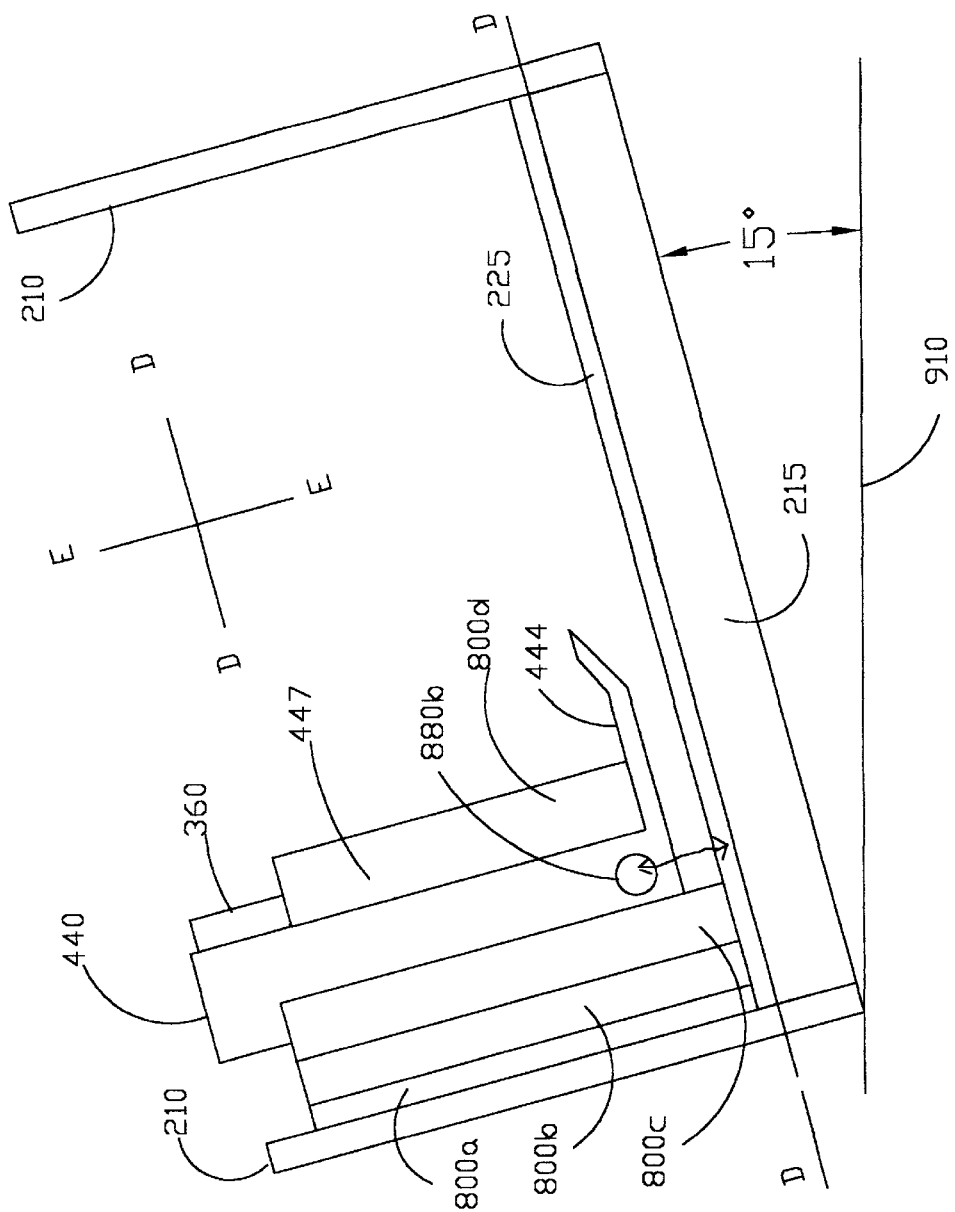
FIG. 9 is a partial side view illustrating the relationship of a placer book rack assembly and a single shelf of a cart.

FIG. 8 is a partial top view of the arrangement of a library cart loading system similar to that identified by numeral 100b in FIG. 1. FIG. 9 illustrates a partial side view from the view illustrated in FIG. 8 as viewed from the center of a shelf 215 along center line C—C. In FIGS. 8 and 9, similarly arranged components have retained the same numeral designations as that of FIG. 1. More specifically thereshown in FIG. 8 are carts 200c and 200d with their top shelves 215 in view. Cart 200d is shown as being empty, and cart 200c is shown with books 800a–c standing upright with their spines facing outward from the shelf, and stacked cover-end to cover-end.

FIGS. 8 and 9 illustrate the situation before book 800d is loaded onto shelf 215. For exposition purposes, in FIG. 9 there is a longitudinal reference axis D—D passing through the surface plane of shelf 215, and a transverse reference axis E—E perpendicular to the plane of shelf 215.

The situation illustrated in FIG. 9 is a condition where tilter 300 associated with a corresponding placer 400 has already received a cart 200, and elevated it so that shelf 215 and corresponding reference axis D—D are at a 15 degree angle relative to the ground plane or horizontal as identified by numeral 910. As depicted in this condition, cart side brace members 210, books 800a–d, book supporting surface 447 of rack 440, and pusher bar 460 are all in parallel alignment.

Figure 10:
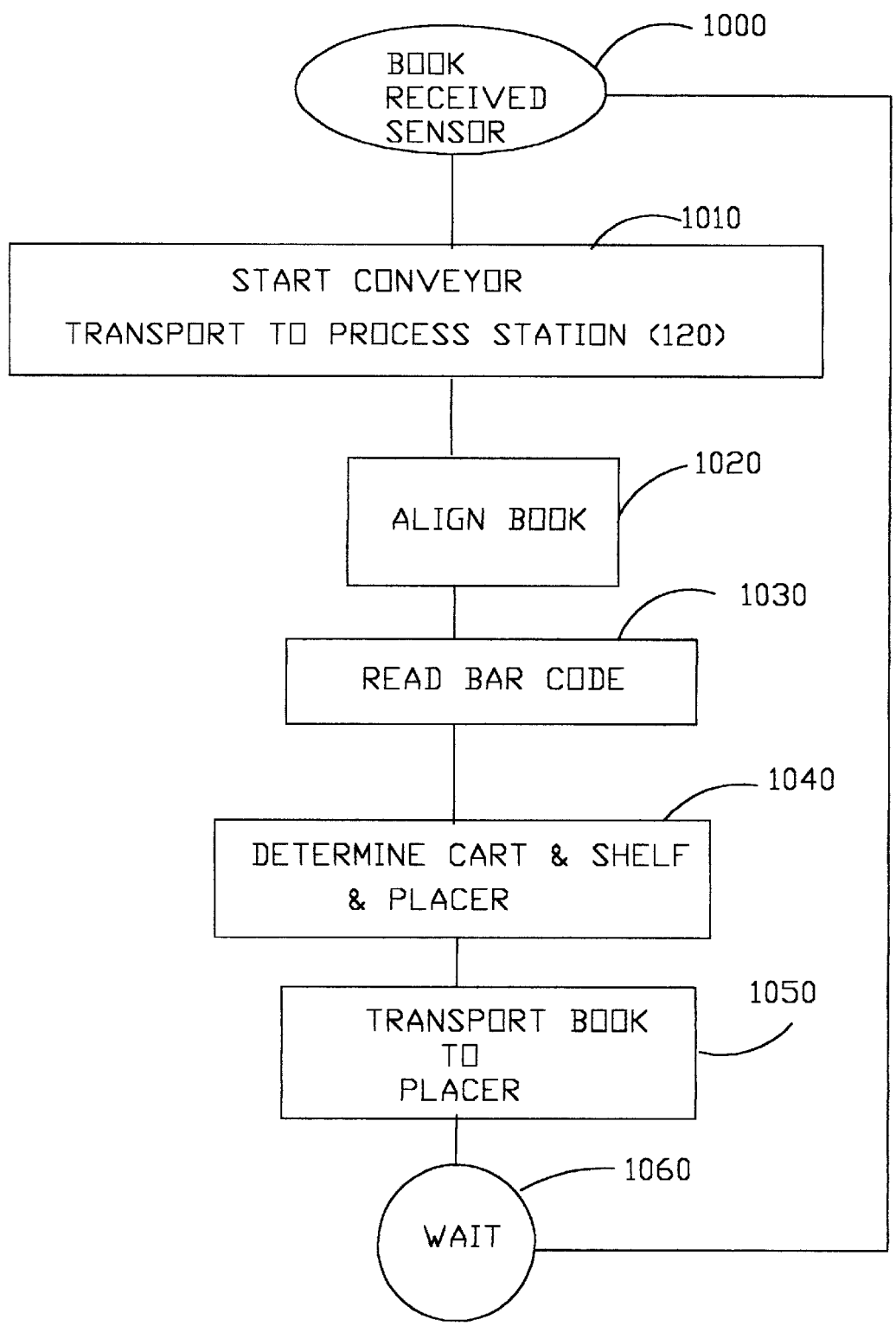
FIG. 10 is a flow diagram illustrating operation of the materials processing station of a library material handling system employing the cart loading system of the present invention.

FIG. 10 is a flow diagram illustrating a control system of a library material handling system employing the library cart loading system of the present invention. Referring to both FIGS. 1 and 10, a sensor (1000) or the like detects the deposit of a book or the like into library material depository 115. In turn, the conveyor is started (1010) so that the material is transported to a materials processing station for alignment by way of a conveying means such as motor driven rollers of a conveyor. In turn, the item is "squared" or aligned (1020) relative to an awaiting book rack assembly 440 of a placer 400, and the bar code associated therewith is read (1030). Based on the (i) library cataloging system and bar code, and (ii) number of tilter 300 and placer 400 stations incorporated into the library handling system, a determination (1040) is made as to (i) which cart the item should be loaded upon, (ii) which shelf on the cart is to be so loaded, and (iii) which placer 400 station is associated with the determined cart. Subsequent to the loading location determination, the material is transported and conveyed to an awaiting book rack assembly 440. This receiving process then awaits for another item to be processed by the library materials processing station 120. It is to be particularly understood, again, that an RFID scheme may be substituted for the aforementioned bar code scheme.

Figure 11:
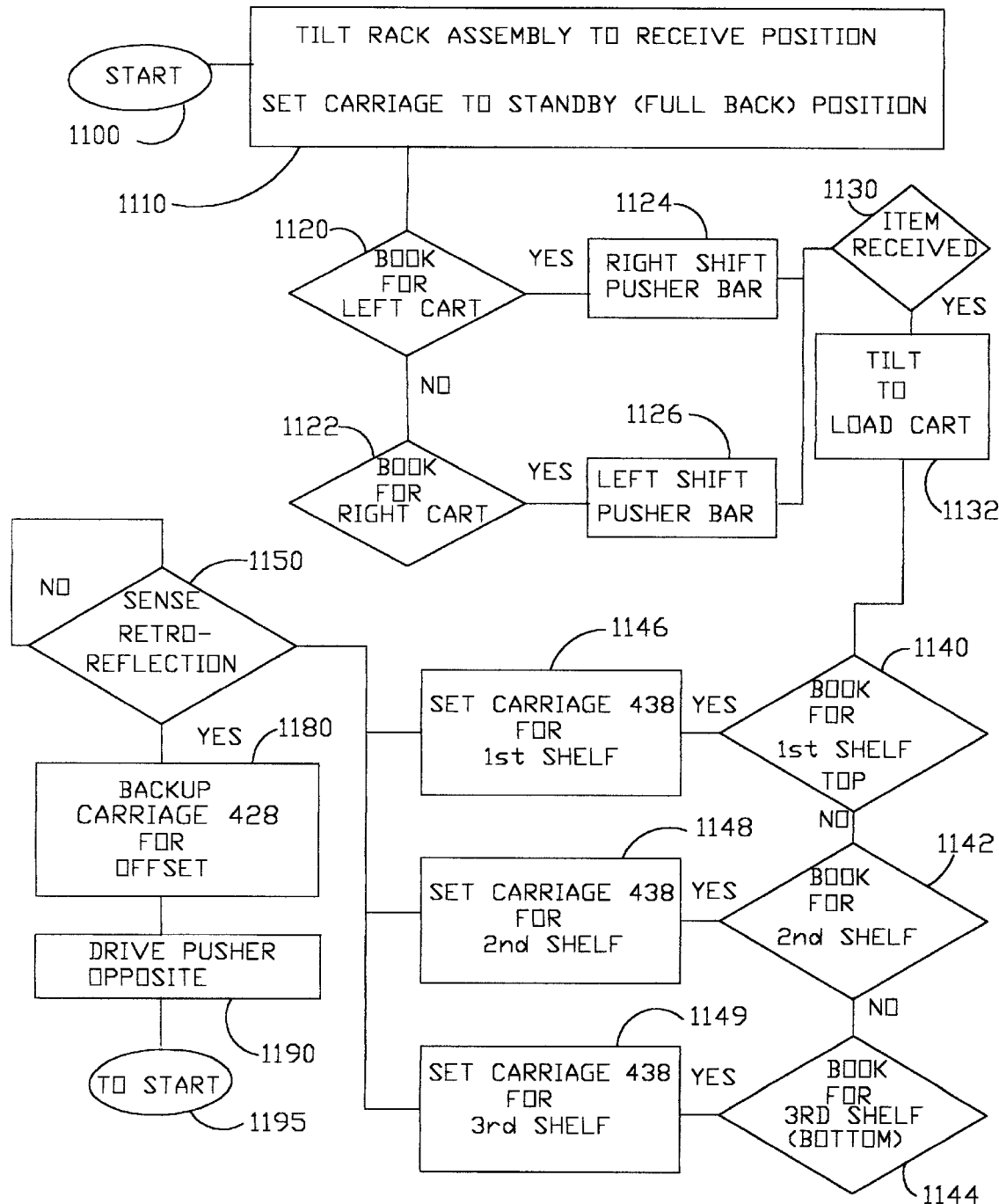
FIG. 11 is a flow diagram illustrating operation of the cart loading system of the present invention.

FIG. 11 is a flow diagram of a single placer 400 in cooperation with a library cart 200 on separate tilters 300 on each side of placer 400 as depicted in FIGS. 1 and 8. A control system initiates (1100,1110) placer 400 so that rack member 442 is at a "material receive position" for proper positioning relative to an item of incoming material from materials processing station 120. This is accomplished by control of book rack assembly angle adjustment means 450 to cause rack member 442 to be closer to horizontal, but to still tilt downward so that gravity will cause an item to slide toward ledge member 444 when an item is transported off of materials processing station 120. Further, carriage 428 of forward linear transport slide 420 is set to a full back or "receive" position, and carriage 438 of upward linear transport slide 430 is set to a full up or "receive" position.

Materials processing station 120 transfers appropriate information to the particular placer 400 determined by materials processing station 120. In turn the corresponding pusher bar 460 of the appropriate book rack assembly 440 is shifted to the right or the left depending upon whether the item is to be loaded on the right or left cart, respectively (1120, 1122,1124, and 1126).

Upon detection of the designated received item (1130), rack member 442 is tilted to a load position (1132) by way of book rack assembly angle adjustment means 450. In turn, carriage 438 of upward linear transport slide 430 is set to a proper position for loading one shelf 215 of cart 200 (1140, 1142,1144, 1146, 1148, and 1149).

Figure 13:
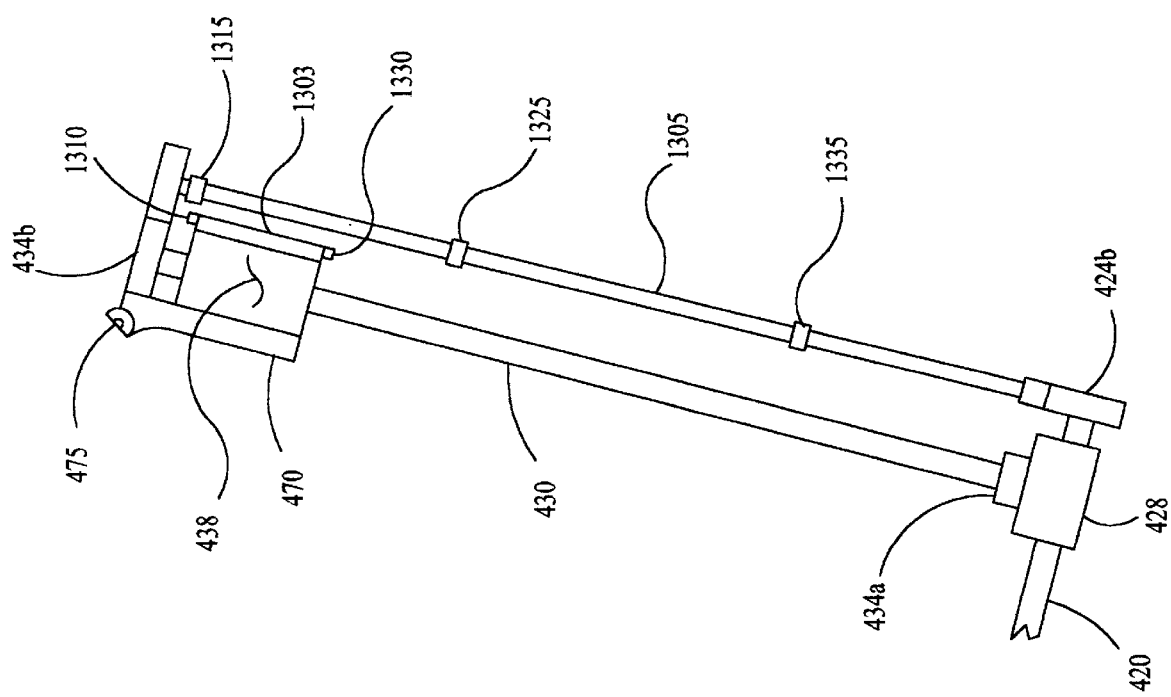
FIG. 13 is a simplified illustration of FIG. 5, depicting a shelf selection means constructed in accordance with the present invention.
Figure 14:
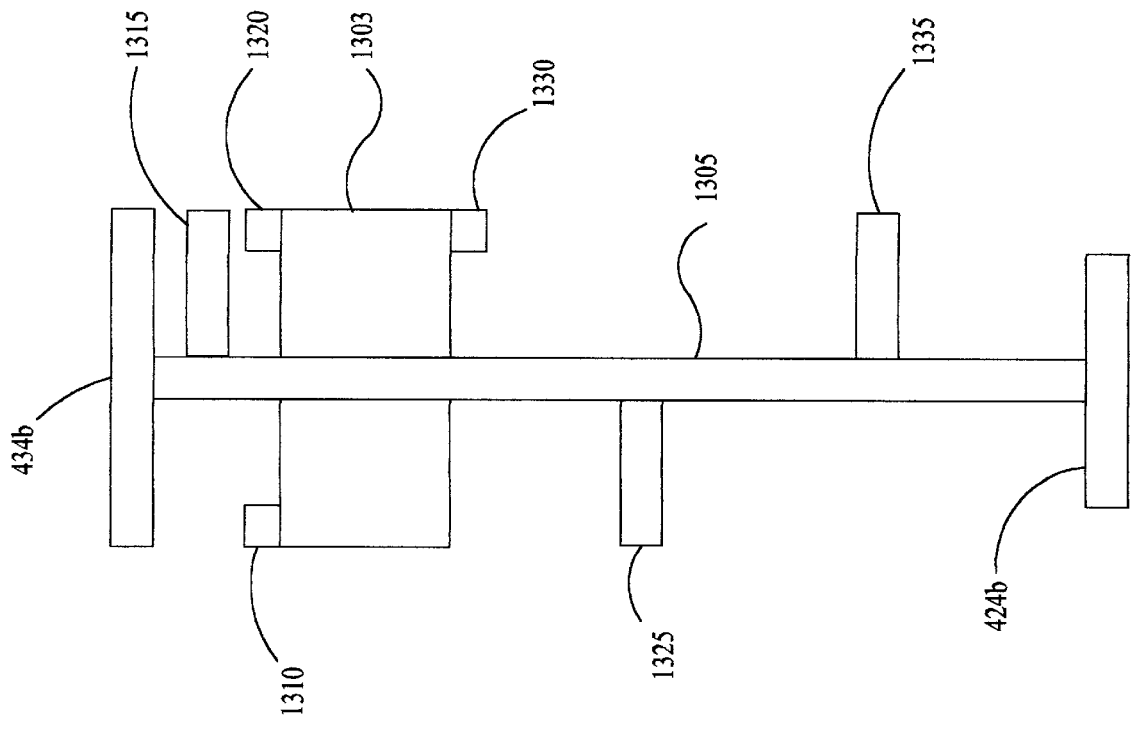
FIG. 14 is a rear view illustration of the shelf selection means depicted in FIG. 13.

With reference to FIGS. 13 and 14, the setting of carriage 438 to the proper position is accomplished by way of a photoelectric sensing scheme including optical transmitters/ receivers (not illustrated). The optical transmitters/receivers have, respectively, associated transmitting/receiving red light elements 1310,1320, and 1330. Each transmitter/ receiver element 1310,1320, and 1330, provides a light output from, and an input to, the optical transmitters/ receivers associated respectively therewith. The sensing scheme further employs shelf position flags 1315,1325, and 1335, that are each intended to be sensed by, respectively, elements 1320,1310, and 1330. Supporting hardware of this scheme includes attachment bracket 1303 for elements 1310, 1320, and 1330, and pole 1305 for flags 1315,1325, and 1335.

Bracket 1303 may be a plate or C-shaped member that is secured to carriage 438 using any suitable fastening technique (in FIGS. 13–14, bracket 1303 is shown as being a plate member). Bracket 1303 provides a support base and attachment point for elements 1310–1330 thereto. In an exemplary embodiment with particular reference to FIG. 14, element 1310 is secured to bracket 1303 at a top left portion thereof, while elements 1320 and 1330 are secured to top right and lower right portions of bracket 1303, respectively.

Pole 1305 is secured to end block 424b of forward linear transport slide 420. As may be ascertained from the drawings, pole 1305 provides positioning of flags 1315, 1325, and 1335 at selected vertical distances about upward linear transport slide 430. The distances are chosen to correspond with positions of shelves 215 of a cart 200, such that sensing of a flag by an optical transmitter/receiver is indicative, in turn, of carriage 438 being at a position corresponding to a selected shelf 215. It is to be appreciated, then, that by way of selected positioning of the flags on the pole 1305, a non-industry standard cart 200 may be successfully incorporated into the cart loading system of the present invention.

Flags 1315, 1325, and 1335 are secured to pole 1305 at the selected distances by way of, for example, ordinary clamps (not illustrated).

In operation of the photoelectric sensing scheme for the setting of carriage 438, the optical transmitters/receivers generate and output a light beam to their respective elements 1310, 1320, and 1330, via fiber optic cables (not illustrated). As carriage 438 moves vertically, an element 1310, 1320, or 1330, may come into proximity with a flag 1325, 1315, or 1335, respectively. When proximity of an element with a corresponding flag occurs, light being output from the element is reflected off the flag back to the element, and is then transmitted back to the particular optical transmitter/receiver via the fiber optic cable. Responsively, the optical transmitter/receiver generates and outputs a logical "1" or "ON" signal. An "ON" signal from an optical transmitter/receiver is then interpreted by, for example, a computer program embodied within materials processing station 120 as being indicative of a selected position of carriage 438 having been reached. The selected position of carriage 438 then corresponds to a position of a shelf 215 of a cart 200.

For example, with particular reference to FIG. 14, consider when carriage 438 (with attached bracket 1303 and elements 1310, 1320, and 1330) is moving downward toward end block 434*a* to be set for loading a middle shelf 215 of a cart 200. In this example, when light output from element 1310 is reflected from flag 1325 back to element 1310 and via the fiber optic cable to its optical transmitter/receiver, the optical transmitter/receiver outputs an "ON" signal to the computer program of materials processing station 120. The program, in turn, provides for stopping movement of carriage 438 by way of selected operation of upward linear transport slide 430 as aforedescribed.

The fabrication of bracket 1303, flags 1315,1325, and 1335, and pole 1305 may each be from any suitable durable material such as steel and the like. Of course, the fabrication material of flags 1315,1325, and 1335 is also chosen with regard to adequate reflectivity therefrom of light output from elements 1320, 1310, and 1330, respectively.

Preferably, the aforementioned optical transmitters/receivers and associated light elements 1310,1320, and 1330 are provided by way of Allen-Bradley PHOTOSWITCH™ 42KA General Purpose Fiber Optic Photoelectric Sensor packages.

Returning to FIG. 11, after setting of the position of carriage 438, transmitter/receiver 480 fixed to end 479 of rack member 442 is enabled for searching (1150) for an open or unoccupied space on the selected shelf. Once space has been found, assuming a limit sensor has not been enabled, carriage 428 is backed up (1180) to accommodate any offset between detection of the space and the actual planar surface 447 of rack member 442 so that the item cover surface is in approximate alignment plus a "safe tolerance space" beyond an item previously loaded on the cart. In turn, pusher bar 460 is actuated (1190) for pushing the item onto the cart. Thereafter, a return (1195) to a start sequence (1100) may be made.

The operation of the library cart loading system will now described with reference to all of the Figures. First, if necessary, tilter 300 is returned to an at-rest condition by deflation of lifting air spring 360. In such an at-rest condition, cart fork member 320 is substantially horizontal with the library installation floor surface. A preferably empty cart 200 is then loaded or pushed onto cart fork member 320 by library personnel.

As aforedescribed, and as will be appreciated by reference to the drawings, cart 200 when being so loaded onto cart fork member 320 is basically "funneled" onto cart fork member 320. This funneling is achieved through, and by interplay between, tapered outboard end member 324 of cart fork member 320 to cart 200, and by the width of cart fork member 320 being just less than the spacing of cart wheel collars 221 on each frame member end of the cart.

Upon loading cart 200 onto tilter 300 and resting cart 200 against vertical back stop 340 of tilter 300, lifting air spring 360 is inflated. This may be accomplished by manually or automatically switching on inflation means 370 to inflate air spring 360. Automatic operation may be provided, for example, by way of activation of a limit switch (not illustrated) through contact of cart 220 with vertical back stop 340.

Inflation of air spring 360 causes air spring 360 to push upwardly against, and support, cart fork member 320, thereby elevating outboard end member 324 relative to inboard end member 322 about axis B—B of pivot hinge assembly 350 as aforedescribed. In the preferred embodiment of the invention, full inflation of lifting air spring 360 causes cart fork member 320 to elevate so as to be at an angle of 15 degrees above horizontal.

In a standby condition, forward linear transport slide 420 is pneumatically controlled so that carriage 428 is in a full back position, and upward linear transport slide 430 is pneumatically controlled so that carriage 438 is in a full upward position. Further, pusher bar 460 re-sets to an at-rest or "home" position either full left or full right, and book rack assembly angle adjustment means 450 is in a condition such that book rack assembly 440 is in a book receiving position.

Upon receiving an item of material to be placed on cart 200, book rack assembly angle adjustment means 450 is operated to be placed in a load condition. In turn carriage 438 is set (as aforedescribed) so as to be in proper proximity to a shelf 215 of cart 220. After setting carriage 438, transmitter/receiver 480 becomes operative so as to generate a beam of light that is continuously directed onto a portion of a horizontal cart shelf member 215 where reflective tape 225 is located. Since placer 400 is typically operative starting from a full back position of carriage 428, the transmitter/receiver 480 will initially receive no reflected light.

At the beginning of a loading cycle, transmitter/receiver 480 communicates with electromechanical air valve 490 (FIG. 12) which is in communication with end air orifice 429 (FIGS. 6 and 12) of forward linear transport slide 420 causing it to open and allow supplied air to pressurize forward linear transport slide 420 for resultant movement of carriage 428 thereof as aforedescribed. At the beginning of this loading cycle, transmitter/receiver 480 receives no light. Accordingly, book rack assembly 440 moves forward as the aforesaid valve remains open in response to light continuing to not be received due to a lack of reflection from retro-reflective tape 225.

Carriage 428, and corresponding book rack assembly 440, linearly moves forward until retro-reflected light is ultimately received by transmitter/receiver 480 through reflection from exposed retro-reflective tape 225. Upon sensing the reflected light, transmitter/receiver 480 provides a signal to valve 490 so that valve 490 closes and all movement of carriage ceases except for any overshoot, retraction, and forward offset obtained by the arrangement of valves and controls as already described. In turn, pusher bar 460 is operated so as to push the material off of rack member 442 and onto cart shelf 215. After loading the material onto the cart, valve 490 is fully vented through primary air release 478 (FIG. 12) and placer 400 is allowed to return to a standby condition.

Figure 15:
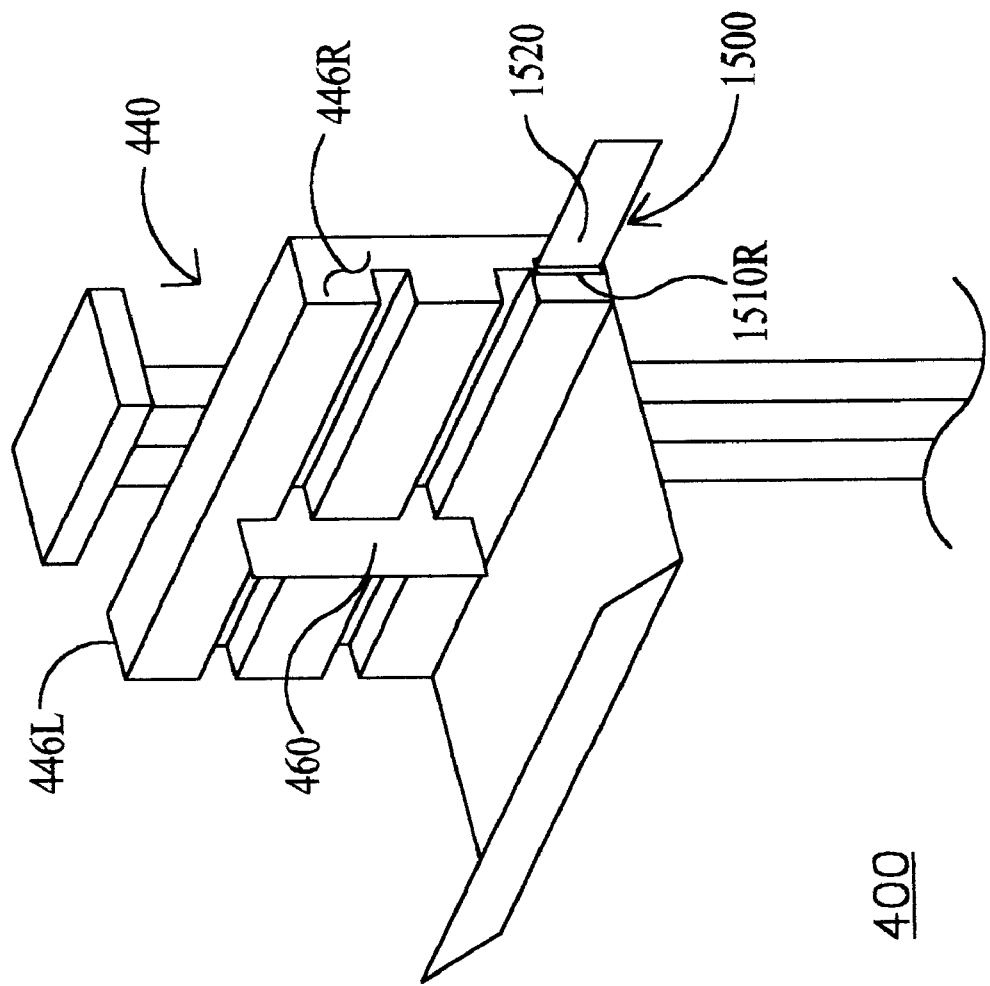
FIG. 15 is a front perspective illustration of a library material placer means constructed in accordance with the present invention, including a materials compacting system.

Illustrated in FIG. 15 is another embodiment of book rack assembly 440 of the present invention having a materials compacting system as will be further described in detail. The materials compacting system in accordance with the present invention is provided to compact or straighten, to some degree, materials previously received on a particular shelf of a cart for more orderly stacking of the materials thereupon, in advance of placing another item of material on the cart shelf. This compaction or straightening of the previously received and stacked materials is desired to overcome a natural tendency of certain materials, and particularly books, to "fan" or open slightly when placed on cart shelves 215 by placer 400. Such fanning or opening may cause difficulty in the operation of subsequent loading of materials on the shelves by placer 400.

In particular, in operation of the library cart loading system of the present invention, a situation of loading interference due to a fanned or slightly opened book may arise even when, as aforedescribed, a "safe tolerance space" beyond an item previously loaded on the cart shelf is provided. Consequently, as material currently being loaded onto a cart shelf is pushed onto the shelf, a fanned or slightly opened book that has been previously placed on the shelf may, notwithstanding the "safe tolerance space", interfere with the material currently being loaded. This interference then may lead to a disruption of orderly stacking of materials on the shelf, and possibly to materials falling off of the shelf.

Figure 16:
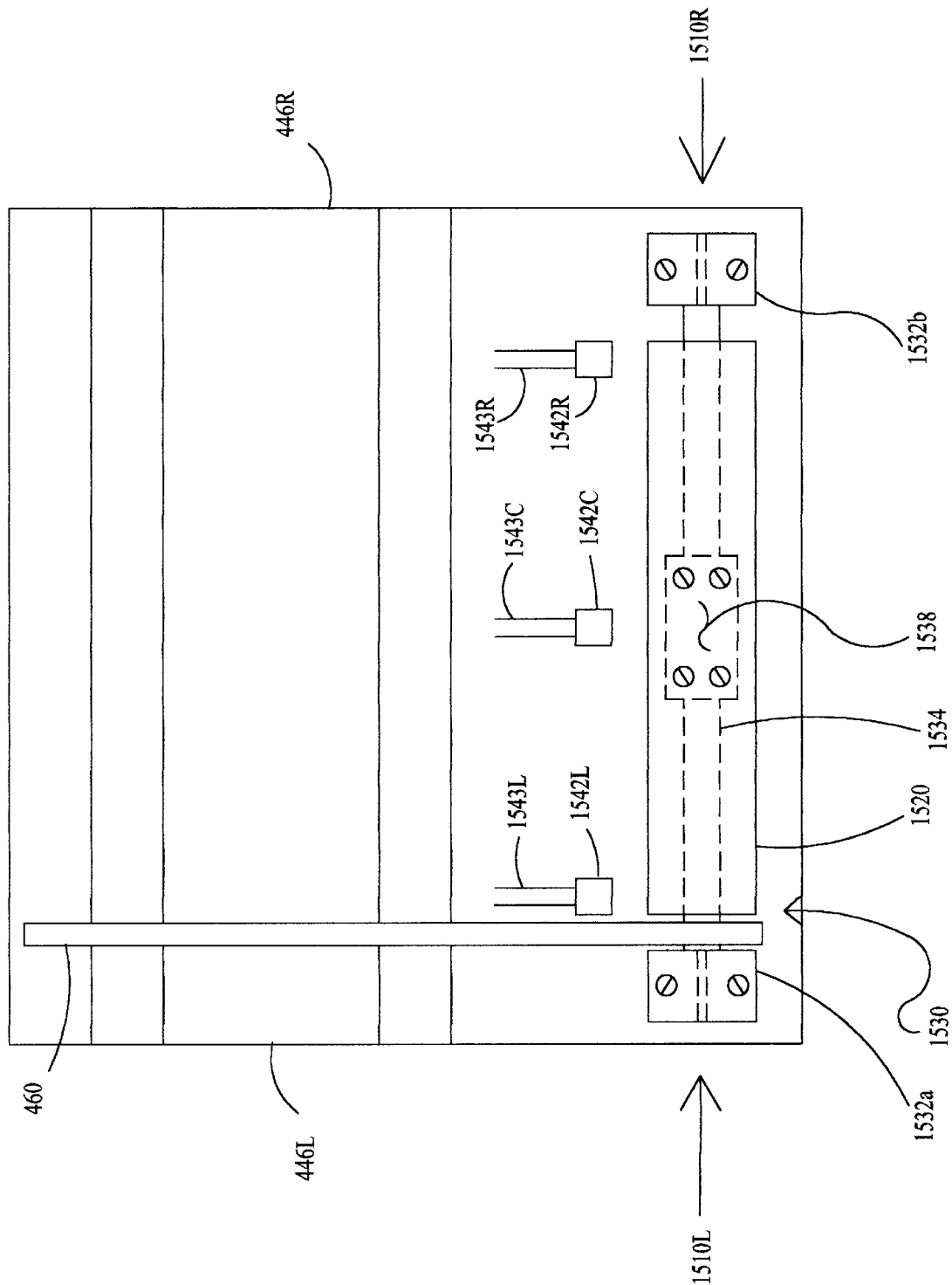
FIG. 16 is a transparent front schematic illustration of the library material placer means depicted in FIG. 15 constructed in accordance with the present invention.
Figure 17:
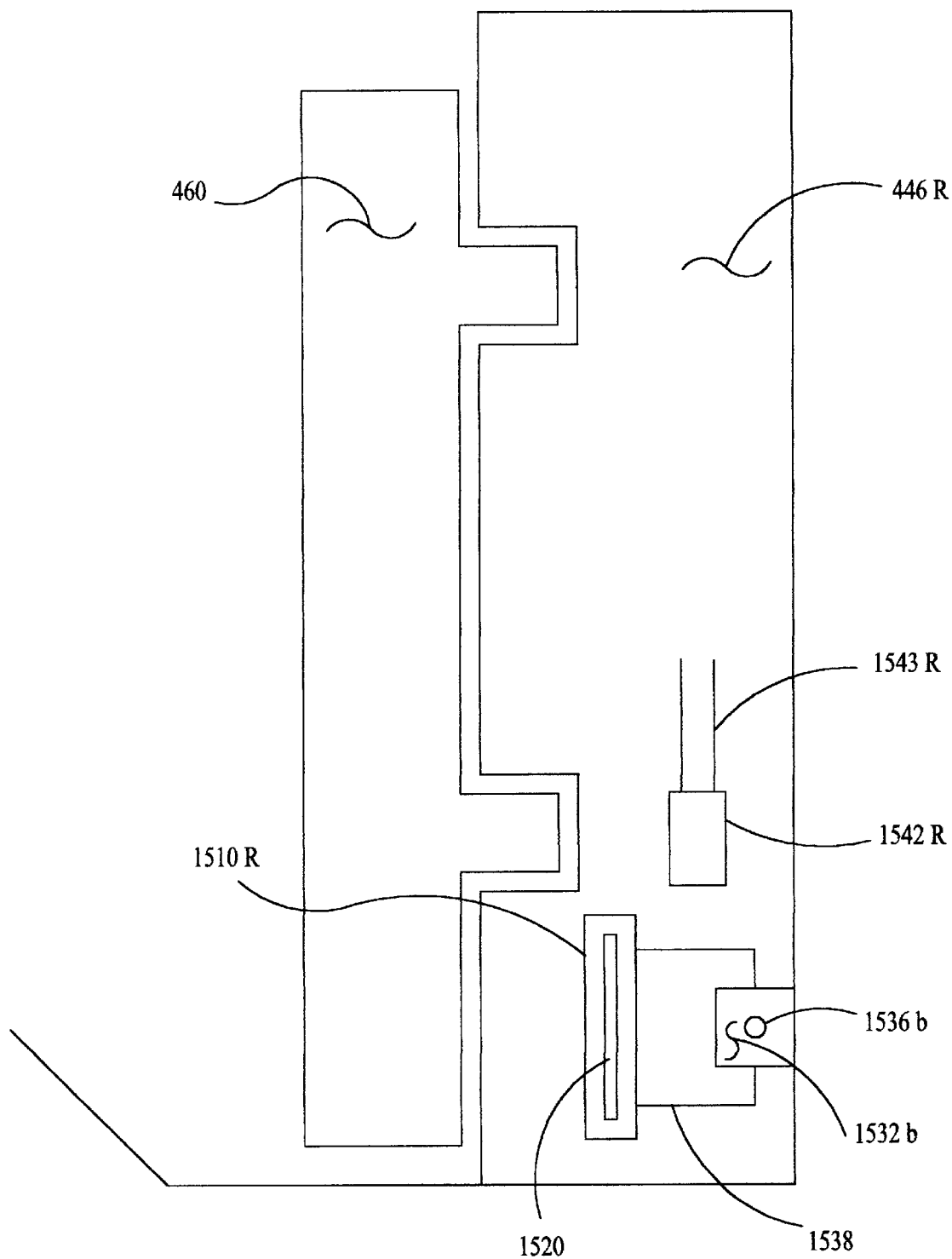
FIG. 17 is a right side view illustration of the library material placer means depicted in FIG. 15 constructed in accordance with the present invention.
Figure 18:
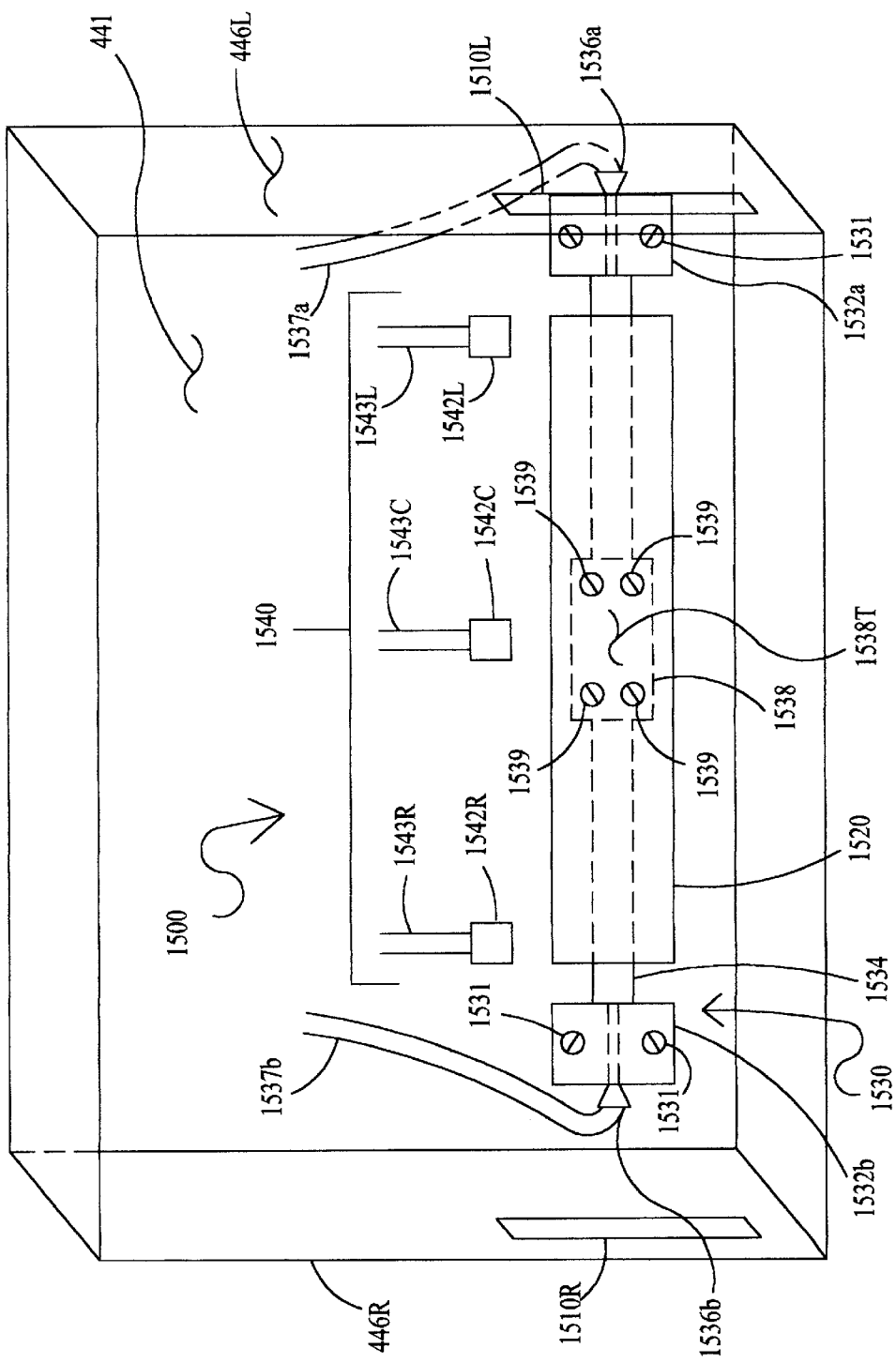
FIG. 18 is a rear perspective illustration of the library material placer means depicted in FIG. 15 constructed in accordance with the present invention.

Referring now to FIGS. 15–17, and particularly to FIG. 18, there shown is a materials compacting system generally identified by numeral 1500. Compacting system 1500 includes a compacting arm 1520 for compacting materials previously placed on a cart shelf, a linear slide 1530, and an arm position sensor means 1540 including transmitter/receiver reflective light elements 1542R, 1542C, and 1542L.

Sides 446L and 446R of rack assembly 440 include left arm and right arm slots or apertures 1510L–R, respectively. Apertures 1510L–R are intended to accommodate compacting arm 1520 in selectively passing, in part, therethrough. Further, as will be described in operation of compacting system 1500, linear slide 1530 provides selected left or right motion of compacting arm 1520. Arm position sensor means 1540 provides sensing of a position of compacting arm 1520.

Referring in particular to FIG. 18, there shown is a simplified perspective rear view illustration of book rack assembly 440 including the aforementioned left arm and right arm apertures 1510L–R, compacting arm 1520, linear slide 1530, and arm position sensor means 1540. It is to be noted that FIG. 18 is drawn in accordance with FIG. 7 (showing back side 441 of book rack assembly 440) without depiction of drive mechanism 700 for clarity of the drawing.

Left arm and right arm apertures 1510L–R are generally identical rectangular apertures provided through sides 446L–R, respectively, of book rack assembly 440. Apertures 1510L–R have dimensions chosen to permit compacting arm 1520 to move freely therethrough without frictional interference. Apertures 1510L–R are provided through sides 446L and 446R, respectively, by way of, for example, drilling or machining.

Linear slide 1530 is securely attached to back side 441 of book rack assembly 440 at a lower central portion thereof, by any suitable technique such as by bolting (generally depicted by reference numerals 1531) end blocks 1532ab to back side 441.

Figure 19:
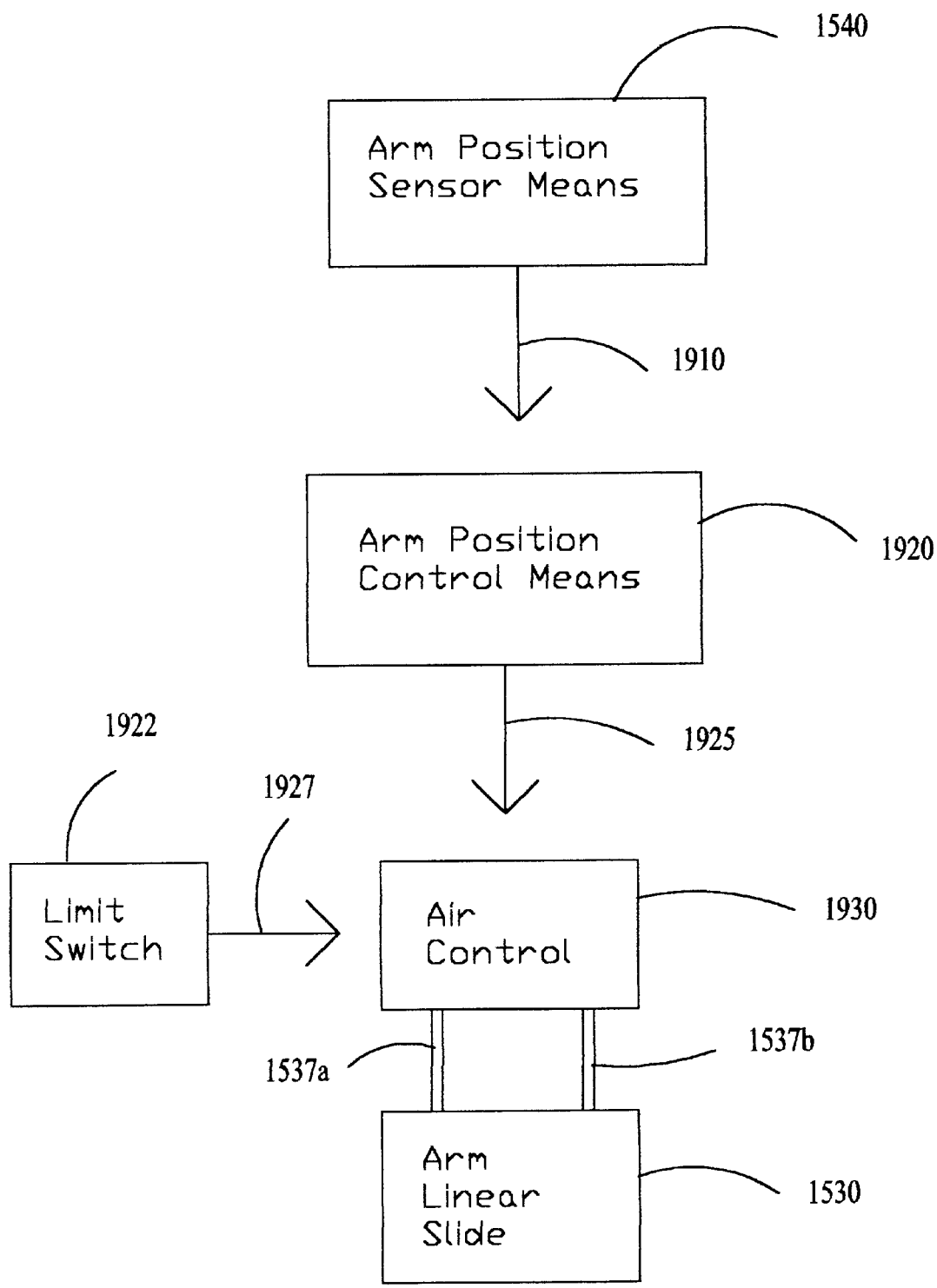
FIG. 19 is a schematic block diagram illustrating a materials compacting system control scheme in accordance with the present invention.

Preferably, linear slide 1530 is a Bimba "Ultran-Series" rodless air-operated linear slide having a 13" stroke and a $\%_{16}$" bore. It is to be noted that this exemplary Bimba device for linear slide 1530 is intended to be mechanically and functionally similar to the aforedescribed Bimba devices relative to forward linear transport slide 420 and upward linear transport slide 430. Accordingly, linear slide 1530 includes end block 1532a secured to one end of a piston tube body 1534, and end block 1532b secured to an opposite end of piston tube body 1534. Linear slide 1530 further includes (i) an air-actuated piston (not illustrated) contained within piston tube body 1534, (ii) opposing end air orifices 1536a and 1536b in communication with air chambers within end blocks 1532a and 1532b, respectively, and with an interior of piston tube body 1534, and (iii) a carriage 1538 having a top mounting surface 1538T. Carriage 1538 is magnetically coupled to the piston within piston tube body 1534, as aforedescribed relative to these Bimba devices. In accordance with the present invention, an electromechanical air control, generally identified by reference numeral 1930 in FIG. 19, selectively supplies pressurized air from a pressurized air source (not illustrated) to end air orifices 1536a–b of linear slide 1530 via air lines 1537a–b, respectively coupled thereto. Air control 1930 is intended to be responsive, as will be further described in FIG. 19, to an arm positioning signal 1925 and to a pusher bar limit signal 1927.

Referring again to FIG. 18, compacting arm 1520 is fastened to top mounting surface 1538T at a central portion of compacting arm 1520 such that leftmost and rightmost lengths of compacting arm 1520 capable of passing through apertures 1510L–R, respectively, are about equal. The fastening of compacting arm 1520 to top mounting surface 1538T may be provided, like the fastening of linear slide 1530 to back side 441, by way of bolting (generally depicted by reference numerals 1539) arm 1520 to top mounting surface 1538T. In an exemplary embodiment, compacting arm 1520 has length and width dimensions of about 15.75" by 1.75", respectively, and a thickness of about 0.075".

Referring to FIGS. 16–19, compacting system 1500 includes a compacting arm position sensing and control scheme having arm position sensor means 1540 and arm position control means 1920.

Arm position sensor means 1540 employs a photoelectric sensing technique, provided by way of photoelectric sensors similar to those of the aforedescribed photoelectric sensing scheme for the setting of carriage 438, for ascertaining a position of carriage 1538. The position of carriage 1538 is indicative of a position of compacting arm 1520. Preferably, the photoelectric sensors are commercially available Allen-Bradley PHOTOSWITCH™ 42FB General Purpose Fiber Optic Photoelectric Sensors (not illustrated). These Allen-Bradley photoelectric sensors respectively are coupled to singular red light transmitter/receiver or output/input reflective light elements ("light elements") 1542L, 1542C, and 1542R, by way of fiber optic cables 1543L, 1543C, and 1543R, respectively.

Light elements 1542L, 1542C, and 1542R are secured to back side 441 of book rack assembly 440 in a spatial relationship such that light element 1542C is at a central position relative to linear slide 1530 thereabove, with light elements 1542L and 1542R positioned equidistantly from light element 1542C above linear slide 1530 and in proximity to, respectively, end blocks 1532*a–b*. Light elements 1542L, 1542C, and 1542R are secured to back side 441 utilizing any suitable method, such as housings (not illustrated) for each element being in turn secured to back side 441 through use of fasteners, or simply by way of epoxy cement for directly adhering each element to back side 441. Positioning of the light elements is provided so that (i) light transmitted from any one of the light elements may, in certain conditions, be reflected from carriage 1538 back to the particular light element, but (ii) no mechanical contact occurs with carriage 1538 as it slides along piston tube body 1534. It is to be further appreciated that the light elements function as reflective devices; i.e., each light element 1542L, 1542C, and 1542R is capable of providing a light output from, and a reflected light input to, the photoelectric sensors associated respectively therewith.

In conventional operation of the photoelectric sensors, a light output is transmitted from a photoelectric sensor via, for example, fiber optic cable 1543R to light element 1542R. A beam of this light output is then projected from light element 1542R. When the projected light reflects off of carriage 1538 back to light element 1542R, the light is transmitted via fiber optic cable 1543R back to the photoelectric sensor associated with light element 1542R. The photoelectric sensors responsively generate and output a logical "1" or "ON" signal as they continue to receive uninterrupted reflected light beams off carriage 1538 from their respective light elements via the fiber optic cables, and a logical "0" or "OFF" signal when light is not reflectively received off carriage 1538. With additional reference to FIG. 19, these logical "1" or "0" signals are collectively provided as arm position sensor means signals 1910 output from arm position sensor means 1540, and input to arm position control means 1920. Arm position control means 1920 then selectively generates and outputs an arm movement command signal 1925 to air control 1930, for selected movement of compacting arm 1520 by way of actuation of linear slide 1530.

With reference, now, to the drawings, and particularly again to FIGS. 16 and 17, an exemplary operation of compacting system 1500 will be described relative to operation of placer 400 in loading materials onto a right-side cart 200.

In this regard, the preliminary aforedescribed material loading operations, specifically including the operations of:

(i) transferring the appropriate information to placer 400 determined by materials processing station 120;

(ii) shifting pusher bar 460 of book rack assembly 440 to the left;

(iii) receiving an item of material to be placed on right-side cart 200 at rack member 442;

(iv) setting carriage 438 of upward linear transport slide 430 to the proper position for loading one of the shelves of right-side cart 200; and (v) enabling transmitter/receiver 480 for searching for an open or unoccupied space on the selected shelf, have each been accomplished.

In a first operation of compacting system 1500, the logical "1" or "0" signals of the photoelectric sensors are interpreted by arm position sensor means 1540 as indicative of a present position of carriage 1538, by any suitable algorithmic-type means such as, for example, by a computer program (not illustrated) operative in a computer workstation (not illustrated). For instance, if carriage 1538 is at the home position adjacent to light element 1542C, the photoelectric sensor associated with light element 1542C would generate and output a "1" to arm position sensor means 1540, while the sensors associated with light elements 1542L and 1542R would each generate and output a "0" to arm position sensor means 1540. These signals are then interpreted via the computer program as an instance where carriage 1538, and thus compacting arm 1520, are at home.

In turn, arm position sensor means 1540 selectively generates and outputs arm position sensor means signal 1910 to arm position control means 1920. Arm position control means 1920 responsively generates and outputs an arm movement command signal 1925 to air control 1930, for delivery of pressurized air to end block 1532*a*. Accordingly, compacting arm 1520 departs from the home position and deploys through aperture 1510R.

It is to be particularly understood that generation of selected arm movement command signals 1925 are also subject to and conditioned upon the aforementioned information delivered to placer 400 as determined by materials processing station 120, when placer 400 is arranged between two carts, with the information being indicative of required left or right extension of compacting arm 1520 (i.e., toward a left-side cart or toward a right-side cart).

As previously described in operation of placer 400, carriage 428 of book rack assembly 440 is then backed-up. Upon the backing-up of carriage 428 with compacting arm 1520 deployed, compacting arm 1520 forcibly acts upon existing materials on the cart shelf to slightly compact and straighten them, in preparation for loading another material item thereon by way of subsequent operation of pusher bar 460.

As pusher bar 460 reaches its travel limit in pushing the item onto the shelf, a pusher bar limit signal 1927 (provided, for example, by a limit switch 1922 associated with drive mechanism 700 of pusher bar 460) is transmitted to air control 1930 for corresponding retraction of compacting arm 1520 to the "home" position (where 1542L=0, 1542C=1, and 1542R=0).

Pusher bar 460 then returns to its home position, as aforedescribed.

Referring, now, to FIGS. 4 and 5, placer 400 may incorporate a direct photoelectric sensing scheme, as an alternative to utilizing tape 225 as aforedescribed.

It has been observed, in operation of placer 400, that tape 225 can become scuffed or otherwise damaged due to loading operations of materials occurring there across. This scuffing of tape 225 may lead to a problem in operation of optical transmitter/receivers 480*a–b* in detection of the presence or absence of reflected light from tape 225, due to a general "dullness" of scuffed tape. In an attempt to overcome this problem, the sensing gain of each optical transmitter/receiver 480*a–b* is increased so that dull tape 225 may be recognized. However, when optical transmitters/receivers 480*a–b* having increased sensing gains momentarily encounter relatively much brighter new or un-scuffed tape 225, errors may occur. Specifically, when new tape is slightly exposed between spaces that may occur between materials stacked on a shelf, the brightness of such slightly exposed tape "triggers" the increased gain optical transmitters/receivers into a false recognition of having found an empty shelf space for operation of placer 400.

The aforementioned direct photoelectric sensing scheme is provided to alleviate this false recognition problem.

In this alternative embodiment of the invention utilizing the direct sensing scheme, longitudinal shelf side members 217L and 217R simply do not have tape 225 affixed thereto. Also, with reference to FIGS. 4 and 5, optical transmitters/ receivers 480*a*–*b* are preferably the aforementioned Allen-Bradley PHOTOSWITCH™ 42FB General Purpose Fiber Optic Photoelectric Sensors in combination with, respectively, corresponding transmitting/receiving red light elements coupled to the Allen-Bradley direct photoelectric sensors via fiber optic cables. Rather than sensing surfaces of longitudinal shelf side members 217L–R as was done by way of tape 225, the direct photoelectric sensors sense an area about 1" above the surfaces of side members 217L–R. In this manner, when light transmitted by the light elements is reflected from the materials themselves stacked on a shelf and is received back at the elements, the sensors generate and output a "1" or "ON" signal as aforedescribed in operation of these devices. When light is not reflected, the sensors generate and output a "0" or "OFF" signal, being generally indicative of an open space on the shelf for placing a next item of material thereupon. In turn, transmitters/receivers 480*a*–*b* incorporating the direct photoelectric sensors provide the aforementioned control signal along signal line 483, for operation of electromechanical air valve 490 as particularly illustrated in FIG. 12 in operation of placer 400.

It should be noted that the library cart loading system is intended to be incorporated into any library material handling system generally incorporating a cataloging identifier (whether by way of bar code, RFID, or any suitable technique) associated with each specific item of library material. Therefore, it should be understood that the cart loading system is preferably controlled by a computerized control system such as a computer workstation or the like. Although the operational control of the cart loading system has been described herein in simple control terms and concepts, it should be appreciated that more complex controls and systems for controlling the library cart loading system of the present invention are all within the true spirit and scope of the present invention as claimed herein.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

Lastly, the choice, of course, of mechanical sizes and strengths of various components are all a matter of design choice depending upon intended use and objects intended to be handled by the system of the present invention.

For example, compacting arm 1520 may be preferably fabricated from a resin-fiberglass composite material that is reinforced with carbon fibers, or a composition of fiber and a polymer, into a thin and generally rectangular arm member. The resin-fiberglass composite material including, for example, a composite of Kevlar™ fiber and epoxy resin, is preferably selected for the fabrication of compacting arm 1520 due to inherent properties of elasticity that allow for deformation thereof without unwanted "memory". That is, such material is known to be capable of bending and momentarily deforming, as may be necessary in utilization of compacting arm 1520, without such bending and momentary deformation causing a permanent change of an originally fabricated shape. Alternatively, compacting arm 1520 could, for example, simply be fabricated from 14 ga. stainless sheet steel or from any other suitable fiber-resin composite such as conventional fiberglass.

Accordingly, these and other various changes or modifications in form and detail of the present invention may also be made therein, again without departing from the true spirit and scope of the invention as defined by the appended claims.

What is claimed is:

1. A cart loading system for placing library-like items onto a library cart, wherein said cart includes a plurality of shelves between first and second cart end members, said cart loading system comprising:
   a cart tilting means for receiving said cart, said cart tilting means including means for tilting said cart so as to raise said second cart end member relative to a ground plane and relative to said first cart end member such that said shelves are at a selected angle relative to said ground plane; and
   a placer means including,
      a rack member for supporting an individual item thereon,
      a pusher means for pushing said individual item off of said rack member,
      transport means coupled to said rack member for positioning said rack member,
         (i) in proximity to a selected shelf of said plurality of shelves, and
         (ii) in proximity to an open space on said selected shelf away from said first cart end member, so that said pusher means is capable of pushing said individual item off of said rack member and onto said open space on said selected shelf, and
      compacting means coupled to said rack member for compacting any library-like items on said selected shelf.

2. The cart loading system of claim 1 wherein said transport means further includes:
   a first linear slide actuator having a first carriage, said first carriage being capable of moving back and forth along a first path in alignment with a first reference axis;
   a second linear slide actuator having a second carriage, said second carriage being capable of moving back and forth along a second path in alignment with a second reference axis;
   means for mounting said second linear slide actuator to said first carriage such that said first reference axis is transverse to said second reference axis, and said first reference axis is substantially at said selected angle relative to said ground plane; and
   means for coupling said rack member to said second carriage such that:
      i) said second carriage is capable of transporting said rack member to a position in proximity to said selected shelf, and
      ii) said first carriage is capable of transporting said rack member in substantial longitudinal alignment with said selected shelf to a position in proximity to said open space on said selected shelf.

3. The cart loading system of claim 1 further comprising:
   a first photoelectric sensor means coupled to said rack member for providing a shelf output signal indicative of a specific shelf in proximity to said rack member;
   a second photoelectric sensor means coupled to said rack member for providing an open space signal indicative of the presence or absence of an occupied space on said selected shelf away from said first cart end member; and
   control means responsive to (i) a shelf selection signal being representative of said selected shelf upon which said individual item is intended to be placed, (ii) said open space signal, and (iii) said shelf output signal, for providing a transport command signal for causing said transport means to position said rack member so that said pusher may push said individual item onto a first open space on said selected shelf away from said first cart end member.

4. The cart loading system of claim 1 further comprising:
a depository for receiving said individual item;
an identification means for generating a shelf selection signal indicative of which shelf of said plurality of shelves said item is intended to be placed upon; and
conveying means for conveying said individual item to said rack member.

5. The cart loading system of claim 4 wherein said identification means is selected from the group consisting of a bar code reader and an RFID system.

6. A cart loading system for placing library-like items onto a library cart, wherein said cart includes a plurality of shelves between first and second cart end members, said cart loading system comprising:
a cart tilting means for receiving said cart, said cart tilting means including means for tilting said cart so as to raise said second cart end member relative to a ground plane and relative to said first cart end member such that said shelves are at a selected angle relative to said ground plane;
a placer means including,
   a rack member for supporting an individual item of library-like items,
   a pusher means responsive to a push signal for pushing said individual item off of said rack member,
   transport means coupled said rack member for positioning said rack member, said transport means including means responsive to a command signal for positioning said rack member,
      (i) in proximity to a selected one shelf of said plurality of shelves, and
      (ii) at an open space on said selected shelf away from said first cart end member, so that said pusher means is capable of pushing said individual item off of said rack member and onto said open space on said selected shelf,
   shelf sensing means coupled to said rack member for sensing the position of said rack member relative to said plurality of shelves, and providing a shelf output signal indicative thereof, and
   open space sensing means coupled to said rack member for sensing an open space on said selected shelf, and providing an open space signal indicative thereof; and
control means responsive to (i) a shelf selection signal indicative of said selected shelf, (ii) said open space signal, and (iii) said shelf output signal, for providing said command signal and said push signal such that said rack member is first positioned relative to said selected shelf prior to said push signal so that said pusher means may push said item onto said first open space away from said first cart end member on said selected shelf.

7. The cart loading system of claim 6 wherein:
said placer means includes compacting means coupled to said rack member for compacting any library-like items on said selected shelf, said compacting means including an arm member capable of extending away from said rack member in response to a reach signal, and retracting in response to a retract signal; and
said control means further includes means for generating said command signal, said push signal, said reach signal, and said retract signal such that:

said transport means successively,
   i) positions said rack member in proximity to said selected shelf,
   ii) positions said rack member relative to a first open space on said selected shelf away from said first cart end member associated therewith, and
   iii) transports said rack member, after generating said reach signal, toward said first cart end member associated with said selected shelf so as to cause said arm member to compact any library-like items on said selected shelf toward said first cart end member, and
said control means,
   i) generates said push signal so as to cause said individual item on said rack member to be pushed onto said selected shelf, and
   ii) generates said retract signal.

8. The cart loading system of claim 6 wherein said transport means includes:
a first linear slide actuator having a first carriage being capable of moving back and forth along a first path in alignment with a first reference axis;
a second linear slide actuator having a second carriage being capable of moving back and forth along a second path in alignment with a second reference axis;
means for mounting said second slide actuator to said first carriage such that said first reference axis is transverse to said second reference axis, and said first reference axis is substantially at said selected angle relative to said ground plane; and
means for coupling said rack member to said second carriage such that:
   ii) said second carriage is capable of transporting said rack member in proximity to said selected shelf of said plurality of shelves, and
   i) said first carriage is capable of transporting said rack member in substantial alignment with said selected shelf.

9. The cart loading system of claim 6 wherein said open space sensing means is a photoelectric sensor means coupled to said rack member for providing said open space signal indicative of the presence or absence of an occupied space away from said first cart end member.

10. The cart loading system of claim 6 wherein said shelf sensing means is a photoelectric sensor means coupled to said rack member for providing said shelf output signal indicative of a specific shelf in proximity to said rack member.

11. The cart loading system of claim 6 further comprising:
a depository for receiving said individual item;
an identification means for generating a shelf selection signal indicative of which shelf of said plurality of shelves said item is intended to be placed upon; and
conveying means for conveying said individual item to said rack member.

12. The cart loading system of claim 11 wherein said identification means is selected from the group consisting of a bar code reader and an RFID system.

13. A cart loading system for placing library-like items onto a selected shelf of first and second carts, wherein each of said first and second carts includes a plurality of shelves between first and second cart end members, said cart loading system comprising:
a first cart tilting means for receiving said first cart, said first cart tilting means including means for tilting said first cart so as to raise said second cart end member of said first cart relative to a ground plane and relative to said first cart end member of said first cart such that said shelves of said first cart are at a selected angle relative to said ground plane;

a second cart tilting means for receiving said second cart, said second cart tilting means including means for tilting said second cart so as to raise said second cart end member of said second cart relative to a ground plane and relative to said first cart end member of said second cart such that said shelves of said second cart are at a selected angle relative to said ground plane; and a placer means positioned between said first cart tilting means and said second cart tilting means, said placer means including,
- a rack member for supporting an individual item of library-like items,
- a pusher means for pushing said individual item off of said rack member,
- transport means coupled to said rack member for positioning said rack member,
  - (i) in proximity to a selected shelf of said plurality of shelves of one of said first and second carts, and
  - (ii) at an open space on said selected shelf away from said first cart end member, so that said pusher means is capable of pushing said individual item off of said rack member and onto said open space on said selected shelf, and
- compacting means coupled to said rack member for compacting any library-like items on said selected shelf.

14. A cart loading system for placing library-like items onto a selected shelf of first and second carts, wherein each of said first and second carts includes a plurality of shelves between first and second cart end members, said cart loading system comprising:

a first cart tilting means for receiving said first cart, said first cart tilting means including means for tilting said first cart so as to raise said second cart end member of said first cart relative to a ground plane and relative to said first cart end member of said first cart such that said shelves of said first cart are at a selected angle relative to said ground plane;

a second cart tilting means for receiving said second cart, said second cart tilting means including means for tilting said second cart so as to raise said second cart end member of said second cart relative to a ground plane and relative to said first cart end member of said second cart such that said shelves of said second cart are at a selected angle relative to said ground plane; and a placer means positioned between said first cart tilting means and said second cart tilting means, said placer means including,
- a rack member for supporting an individual item of library-like items,
- a pusher means for pushing said individual item off of said rack member,
- transport means coupled to said rack member for positioning said rack member,
  - (i) in proximity to a selected shelf of said plurality of shelves of one of said first and second carts, and
  - (ii) at an open space on said selected shelf away from said first cart end member, so that said pusher means is capable of pushing said individual item off of said rack member and onto said open space on said selected shelf,
- shelf sensing means coupled to said rack member for sensing the position of said rack member relative to said plurality of shelves of said cart associated with said selected shelf, and providing a shelf output signal indicative thereof; and
- open space sensing means coupled to said rack member for sensing an open space on said selected shelf, and providing an open space signal indicative thereof;
- control means responsive to (i) a shelf selection signal indicative of said selected shelf, (ii) said open space signal, and (iii) said shelf output signal, for providing said command signal and said push signal such that said rack member is first positioned relative to said selected shelf prior to said push signal so that said pusher means may push said item onto said first open space away from said first cart end member on said selected shelf.

15. The cart loading system of claim 14 wherein:

said placer means includes compacting means coupled to said rack member for compacting any library-like items on said selected shelf, said compacting means including an arm member capable of extending away from said rack member in response to a reach signal, and retracting in response to a retract signal; and said control means further includes means for generating said command signal, said push signal, said reach signal, and said retract signal such that:
said transport means successively,
  - i) positions said rack member in proximity to said selected shelf,
  - ii) positions said rack member relative to a first open space on said selected shelf away from said first cart end member associated therewith, and
  - iii) transports said rack member, after generating said reach signal, toward said first cart end member associated with said selected shelf so as to cause said arm member to compact any library-like items on said selected shelf toward said first cart end member, and
said control means,
  - i) generates said push signal so as to cause said library item on said rack member to be pushed onto said selected shelf, and
  - ii) generates said retract signal.

16. The cart loading system of claim 14 wherein said transport means includes:

a first linear slide actuator having a first carriage being capable of moving back and forth along a first path in alignment with a first reference axis;

a second linear slide actuator having a second carriage being capable of moving back and forth along a second path in alignment with a second reference axis;

means for mounting said second slide actuator to said first carriage such that said first reference axis is transverse to said second reference axis, and said first reference axis is substantially at said selected angle relative to said ground plane; and means for coupling said rack member to said second carriage such that:
  - i) said second carriage is capable of transporting said rack member in proximity to said selected shelf of said plurality of shelves, and
  - ii) said first carriage is capable of transporting said rack member in substantial alignment with said selected shelf.

17. The cart loading system of claim 14 wherein said open space sensing means is a photoelectric sensor means coupled to said rack member for providing said open space signal indicative of the presence or absence of an occupied space away from said first cart end member.

18. The cart loading system of claim 14 wherein said shelf sensing means is a second photoelectric sensor means coupled to said rack member for providing said shelf output signal indicative of a specific shelf in proximity to said rack member.

19. The cart loading system of claim 14 further comprising:
a depository for receiving said individual item;
an identification means for generating a shelf selection signal indicative of which shelf of said plurality of shelves of said first cart and of said second cart said item is intended to be placed upon; and
conveying means for conveying said individual item to said rack member.

20. The cart loading system of claim 19 wherein said identification means is selected from the group consisting of a bar code reader and an RFID system.

21. A method of loading library-like items onto a cart, wherein said cart includes a plurality of shelves between first and second cart end members, said method comprising the steps of:
positioning said cart upon a tilting means;
tilting said cart, by way of said tilting means, so as to raise said second cart end member relative to a ground plane and relative to said first cart end member such that said shelves are at a selected angle relative to said ground plane;
positioning an individual library-like item on a rack member, wherein said rack member is capable of supporting said individual item;
transporting said rack member so as to be,
(i) in proximity to a selected shelf of said plurality of shelves, and
(ii) in proximity to an open space on said selected shelf away from said first cart end member, such that said individual item may be pushed off of said rack member into said open space;
compacting any library-like items on said selected shelf toward said first cart end member; and
pushing said individual item off of said rack member and onto said selected shelf.

22. The method of claim 21 wherein said step of compacting includes compacting said any library-like items on said shelf toward said first cart end member while said individual item is pushed onto said shelf.

23. The method of claim 21 wherein:
said step of compacting includes the step of extending an arm member away from said rack member into said open space above said selected shelf;
said step of transporting said rack member includes the step of transporting said rack member sufficiently toward said cart first end member so as to cause said arm member to compact any library-like items on said selected shelf; and
said step of compacting includes the step of withdrawing said arm member away from said selected shelf after said individual item is pushed onto said selected shelf.

24. The method of claim 21 wherein said step of transporting said rack member further includes the steps of:
receiving a command signal identifying said selected shelf;
sensing the position of said rack member relative to said plurality of shelves;
selectively raising and lowering said rack member relative to said ground plane so as to position said rack member to be in proximity to said selected shelf;
moving said rack member toward said second cart end member; and
sensing a location of said open space on said selected shelf.

25. A method of loading library-like items onto a cart, wherein said cart includes a plurality of shelves between first and second cart end members, said method comprising the steps of:
positioning said cart upon a tilting means;
tilting said cart, by way of said tilting means, so as to raise said second cart end member relative to a ground plane and relative to said first cart end member such that said shelves are at a selected angle relative to said ground plane;
positioning an individual library-like item on a rack member, wherein said rack member is capable of supporting said individual item;
transporting said rack member so as to be,
(i) in proximity to a selected shelf of said plurality of shelves, and
(ii) in proximity to an open space on said selected shelf away from said first cart end member, such that said individual item may be pushed off of said rack member into said open space; and
pushing said individual item off of said rack member and onto said selected shelf.

26. The method of claim 25 wherein said step of transporting said rack member further includes the steps of:
receiving a command signal identifying said selected shelf;
sensing the position of said rack member relative to said plurality of shelves;
selectively raising and lowering said rack member relative to said ground plane so as to position said rack member to be in proximity to said selected shelf;
moving said rack member toward said second cart end member; and
sensing a location of said open space on said selected shelf.

27. A method of loading library-like items onto a selected shelf of first and second carts positioned on opposite sides of an item placer system, with said item placer system including a first cart tilting means, a second cart tilting means, and a rack member, wherein each of said first and second carts includes a plurality of shelves between first and second cart end members, said method comprising the steps of:
positioning said first cart upon said first tilting means, and positioning said second cart upon said second tilting means;
tilting said first and second carts, by way of said first and second tilting means, so as to raise said second cart end member of each cart relative to a ground plane and relative to its respective said first cart end member such that said shelves are at a selected angle relative to said ground plane;
positioning an individual library-like item on said rack member, wherein said rack member is capable of supporting said individual item;
transporting said rack member so as to be,
(i) in proximity to a selected shelf of said plurality of shelves of one of said first and second carts, and
(ii) in proximity to an open space on said selected shelf away from said first cart end member, such that said individual item may be pushed off of said rack member into said open space;
compacting any library-like items on said selected shelf toward its corresponding said first cart end member; and
pushing said individual item off of said rack member and onto said selected shelf.

* * * * *